United States Patent
Tang et al.

(10) Patent No.: US 8,090,132 B2
(45) Date of Patent: Jan. 3, 2012

(54) WIRELESS COMMUNICATION HEADSET WITH WIRED AND WIRELESS MODES

(75) Inventors: John Tang, San Carlos, CA (US); Brett Alten, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1302 days.

(21) Appl. No.: 11/620,668

(22) Filed: Jan. 6, 2007

(65) Prior Publication Data

US 2008/0167087 A1   Jul. 10, 2008

(51) Int. Cl.
   *H04R 25/00*   (2006.01)
(52) U.S. Cl. .................................. 381/361; 381/375
(58) Field of Classification Search .............. 455/41.1, 455/41.2, 41.3, 569.1, 573, 575.2; 439/345, 439/626; 381/361, 362, 370, 375, 382, 384
   See application file for complete search history.

(56) References Cited

U.S. PATENT DOCUMENTS 6,978,163 B2 * 12/2005 Dyer et al. ................ 455/575.2

OTHER PUBLICATIONS

U.S. Appl. No. 11/650,073, filed Jan. 4, 2007, Tupman.
U.S. Appl. No. 11/650,132, filed Jan. 5, 2007, Johnson et al.
U.S. Appl. No. 11/823,922, filed Jun. 28, 2007, Hankey et al.
U.S. Appl. No. 11/824,180, filed Jun. 28, 2007, Hankey et al.
U.S. Appl. No. 11/824,203, filed Jun. 28, 2007, Hankey et al.
U.S. Appl. No. 11/824,442, filed Jun. 28, 2007, Hankey et al.
U.S. Appl. No. 11/824,443, filed Jun. 28, 2007, Terlizzi et al.
U.S. Appl. No. 11/824,444, filed Jun. 28, 2007, Hankey et al.
U.S. Appl. No. 11/824,453, filed Jun. 28, 2007, Hankey et al.
U.S. Appl. No. 11/824,460, filed Jun. 28, 2007, Terlizzi.

* cited by examiner

*Primary Examiner* — Davetta W Goins
*Assistant Examiner* — Phylesha Dabney
(74) *Attorney, Agent, or Firm* — Kramer Levin Naftalis & Frankel LLP

(57) ABSTRACT

A wireless communication headset having both wired and wireless modes is provided. The wireless headset can include a headset connector assembly that can be coupled to a cable connector of a cable, which can in turn be connected to a telephone. When the wireless headset is coupled to the telephone, it can advantageously be operable to exchange audio information with the telephone through the cable, receive electrical power from the telephone through the cable, or both. In addition, the cable connector can advantageously be coupled to the wireless headset without obstructing airflow to a microphone that is located in the headset connector assembly, through use of apparatus of the invention located on the cable connector, such as an acoustic tunnel, a microphone-speaker pair, or a microphone that is coupled to control circuitry operable to disable the microphone of the headset.

14 Claims, 13 Drawing Sheets

WIRELESS COMMUNICATION HEADSET WITH WIRED AND WIRELESS MODES

BACKGROUND OF THE INVENTION

The present invention can relate to communication headsets. More particularly, the present invention can relate to wireless communication headsets that are operable to transmit data in both wireless and wired modes.

Wireless communication headsets for providing hands-free telephonic communications (e.g., in conjunction with cellular telephones or telephone software that transmits voice data over the Internet) are well known in the art. One relatively common type of wireless communication headset is the Bluetooth® headset, which is operable to communicate with an associated device using a Bluetooth communication protocol. Existing Bluetooth headsets can include a microphone, a speaker, a circuit board for controlling the microphone and speaker and for communicating with the device with which the headset is associated (e.g., a cellular telephone), a battery, and a connector for re-charging the battery. Although the discussion herein focuses on Bluetooth headsets associated with cellular telephones for ease of illustration, it will be understood that the ideas of the invention can also be applied to other types of wireless headsets and telephonic communication devices.

It is often desirable to design Bluetooth headsets to be relatively small and light, in order to provide relatively good comfort and fit when mounted to a user's ear and a relatively pleasing appearance. However, the relatively small form factor of Bluetooth headsets often entails a relatively short battery life, which requires relatively frequent recharging, often using a power adapter that is plugged into an electrical wall outlet. The necessity to recharge headsets in such a manner can make Bluetooth headsets relatively impractical to use for extended conversations.

In addition, Bluetooth headsets typically require a relatively short and unobstructed communication path between the headset and its associated cellular telephone, in order to provide effective transmission of radio frequency ("RF") data signals. If there is some sort of interference (e.g., from physical obstructions, distance, or electromagnetic activity from other devices), the Bluetooth headset may not be able to communicate effectively with the associated device, forcing the user to speak directly into the cellular telephone or use another headset that relies on a direct wired connection to the cellular telephone.

In view of the foregoing, it would be desirable to provide a Bluetooth headset whose power can be charged through a wired connection to its associated cellular telephone. It would also be desirable to provide a Bluetooth headset that can transmit and receive audio data through a wired connection, in addition to through a wireless Bluetooth connection. Further limitations and disadvantages of conventional and traditional approaches will become apparent to one of skill in the art, through comparison of such systems with some aspects of the present invention, as set forth in the remainder of the present application with reference to the drawings.

SUMMARY OF THE INVENTION

In accordance with an embodiment of the invention, a wireless communication headset (e.g., a headset that can communicate with a telephone via Bluetooth communications) can be provided with both wired and wireless modes. The headset can include a headset connector assembly that has at least one headset contact that can be coupled to at least one respective cable contact of a cable connector. Such a configuration can be used to transfer power from a telephone, through a cable and the cable connector, to the wireless communication headset, advantageously allowing the headset to be used for a relatively long period of time without having to be recharged through a docking station or a power adapter. In addition to, or instead of, being used to transfer power from the telephone to the wireless communication headset, the electrical connection can be used to exchange audio data between the telephone and the wireless communication headset.

As such, a user can use a wireless communication headset of the invention to transfer audio data to and from a telephone using both a wireless mode (e.g., via Bluetooth communication) and a wired mode. When the wireless communication headset is coupled to a cable and the cable is connected to a telephone, audio input from the user can be transmitted from the headset to the telephone through the cable. Similarly, the headset can be used to receive audio data, power, or both from the telephone until the cable is decoupled from the telephone or the headset.

In accordance with embodiments of the invention, a cable connector can be coupled to a headset connector plate assembly without obstructing audio input from a user to a microphone located in the connector plate assembly. The cable connector can include at least one cable contact to be electrically coupled to at least one headset contact of the wireless communication headset. The cable connector can also include, for example, an acoustic tunnel that can be coupled to a microphone boot of the headset to form a substantially continuous seal with the microphone boot. The acoustic tunnel can have an aperture that remains exposed while the cable connector is coupled to the headset connector plate assembly, such that audio input from a user can travel into the aperture of the cable connector, through the acoustic tunnel, through the microphone boot, and to a microphone of the wireless headset.

As another example, the cable connector can include a microphone that can receive user audio input when the cable connector is coupled to the headset connector plate assembly. The microphone can forward the user audio input to a speaker of the cable connector, which can in turn transmit user audio data corresponding to the user audio input to the microphone boot of the wireless communication headset (e.g., through an acoustic tunnel that is coupled to the microphone boot). Accordingly, an embedded microphone-speaker pair of the cable connector can substantially amplify or repeat the user's voice into the microphone boot of the wireless communication headset, which is coupled to the microphone of the headset.

In accordance with yet another embodiment of the invention, the cable connector can include a microphone that can receive user audio input. Control circuitry of the cable connector, which can be coupled to the microphone, can transmit at least one control signal to detection circuitry of the wireless communication headset to disable the microphone that is located on the headset. The control circuitry can then route user audio data corresponding to the user audio input to the telephone through a cable, without using the wireless communication headset.

The invention can therefore advantageously provide a wireless headset that can operate in both wired and wireless modes, where the headset can receive power from a telephone, exchange audio data with the telephone, or both through a cable when the headset is in the wired mode. The wireless headset can be coupled to the cable without interfering with the ability to receive audio input from a user and transmit data corresponding to the user audio input to the telephone, even though the microphone of the wireless headset can be at least partially obstructed by the connection to the cable.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
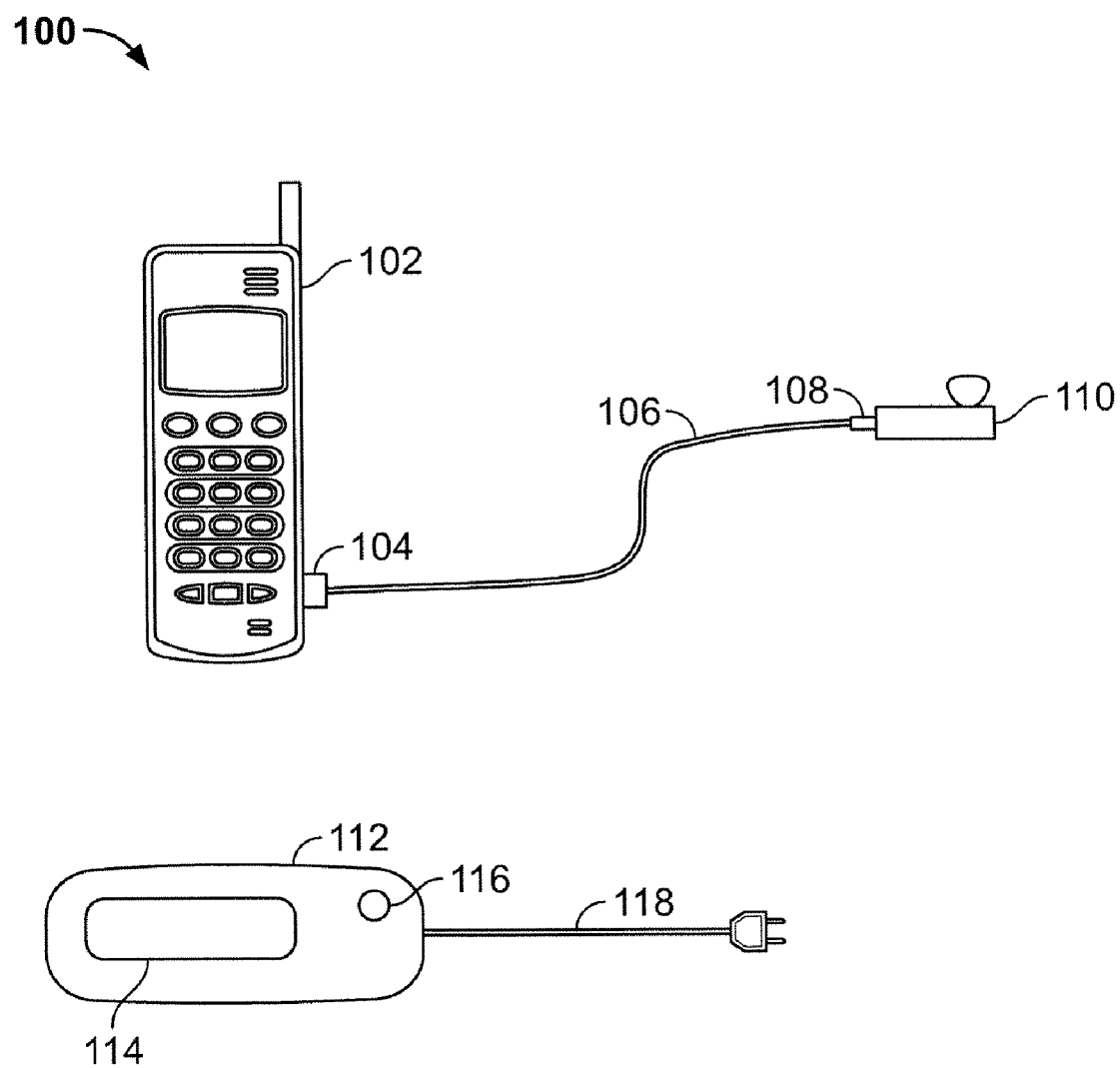
FIG. 1 is a diagram depicting an illustrative Bluetooth telephonic communication system in accordance with an embodiment of the invention.

FIG. 1 is a drawing depicting an illustrative Bluetooth telephonic communication system 100 in accordance with an embodiment of the invention. System 100 can include telephone 102 and wireless communication headset 110, which can be electrically coupled to each other by way of cable 106. (As used herein, the term "coupled" should be understood to generically encompass both direct and indirect connections between two structures, including physical connection through intermediate mechanical modules, electrical modules, or any other suitable components or combinations thereof, as well as connections that occur through communication passing through electrical modules, wiring, air, or any other suitable medium or combination thereof.)

Telephone 102 can be any appropriate type of telephone, including a cellular telephone, a wireless landline-based telephone, an internet telephone that is adapted for use with a personal computer system or laptop, or any suitable combination thereof. Similarly, telephone 102 can be adapted to allow a user to initiate and maintain communications with other users through the use of any appropriate communications standard, such as code division multiple access (CDMA), time division multiple access (TDMA), global system for mobile communications (GSM), voice over Internet Protocol (Voice Over IP), or any suitable combination thereof. Such communications can occur through any appropriate intermediate devices, such as cellular telephone towers, signal repeaters, personal computers, Internet routers, or any suitable combination thereof. In addition, telephone 102 can include capabilities that are substantially unrelated to telephonic communications, such as the ability to download and play media (e.g., music or movies), the ability to download and run applications such as games and personal utilities, and any other suitable capabilities or combinations thereof. Illustrative cellular telephone methods and apparatus that can be used in telephone 102 in accordance with an embodiment of the invention is disclosed in co-pending, commonly-assigned U.S. patent application Ser. Nos. 11/650,073 and 11/650,132, respectively filed on Jan. 4, 2007 and concurrently herewith, and respectively entitled "Power Management Systems and Methods" and "Audio I/O Headset Plug and Plug Detection Circuitry", which are hereby incorporated by reference herein in their entireties.

Wireless communication headset 110 can allow a user to communicate with other users through telephone 102 without the need to speak directly into or hear sound directly from telephone 102. That is, a first user wearing wireless communication headset 110 can speak directly into headset 110, which can communicate audio signals carrying information representing the speech of that user to telephone 102, which can transmit communication signals representing that speech to a device associated with a second user. Similarly, speech signals received from that second user at telephone 102 can be communicated to wireless communication headset 102, which in turn can convey such received speech signals to the first user. Wireless communication headset 110 can be any appropriate headset that is adapted for use with telephone 102, and can include an earbud, a canalphone, closed or open headphones, supra-aural or circumaural headphones, or any other suitable combination thereof. In addition, wireless communication headset can be adapted to communicate with telephone 102 using any appropriate means of communication, such as radio frequency (RF) transmission, or any other type of wired or wireless communication or combinations thereof. In accordance with an embodiment of the invention, headset 110 can be a Bluetooth headset incorporating methods and apparatus disclosed in co-pending, commonly-assigned U.S. Provisional Patent Application No. 60/879,177, filed concurrently herewith and entitled "Bluetooth Headset", which is hereby incorporated by reference herein in its entirety. Further details of structures and features that can be implemented in headset 110 will be discussed below in connection with FIGS. 2A-13.

In accordance with an embodiment of the invention, telephone 102 can be coupled to wireless communication headset 110 through cable 106. Cable 106 can be coupled to telephone 102 through connector 104, and can be coupled to wireless communication headset 110 through connector 108. Each of connectors 104 and 108 can be any appropriate type of connector, such as a traditional serial-port or parallel-port plug, a universal serial bus (USB) plug, a plug that relies on at least one magnet to maintain a physical coupling to the corresponding device, or any suitable combination thereof. In accordance with an embodiment of the invention, wireless communication headset 106 can be operable to receive or transmit power, audio signals, or both from or to telephone 102 through cable 106. Similarly, telephone 102 can be configured to receive or transmit power, audio signals, or both to headset 110 through cable 108. Headset 110 can also, or instead, be adapted for use with a personal computer (e.g., one that can communicate with another personal computer or any suitable networked device using Voice Over IP), without the use of an intermediate telephone such as telephone 102. In such a scenario, headset 110 can be operable to communicate with the personal computer using any appropriate means, such as through a cable coupled to a USB port of the personal computer.

Docking station 112 can be used to supply power to telephone 102, headset 110, or both when plugged into an electrical outlet or other appropriate power source through power cable 118. For example, telephone 102 can be powered by a rechargeable battery that is attached to telephone 102. That rechargeable battery can be recharged when desired by placing telephone 102 in slot 114 of docking station 112. Similarly, wireless communication headset 110 can be powered by a rechargeable battery, which might be smaller and less powerful than the battery associated with telephone 102 in order to maintain the relative lightness and small size of headset 110. The rechargeable battery of wireless communication headset 110 can be recharged when desired by placing headset 110 into slot 116 of docking station 112. Docking station 112 can also perform other functions in addition to, or instead of, supplying power to telephone 102 and headset 110. For example, docking station 112 can include at least one speaker that can be coupled to telephone 102 when telephone 102 is in a speakerphone mode, such that audio data can be transferred from telephone 102 to docking station 112 for projection through the at least one speaker.

Figure 2A:
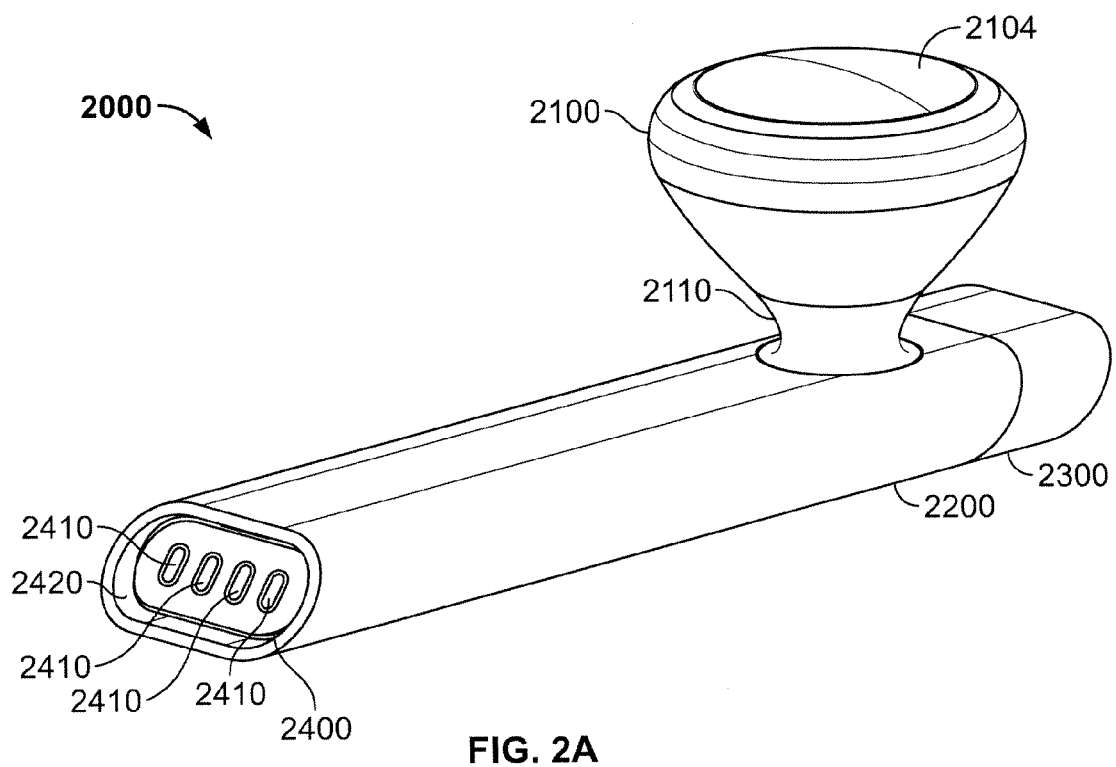
FIGS. 2A and 2B are perspective views of an illustrative Bluetooth headset in accordance with an embodiment of the invention.
Figure 2B:
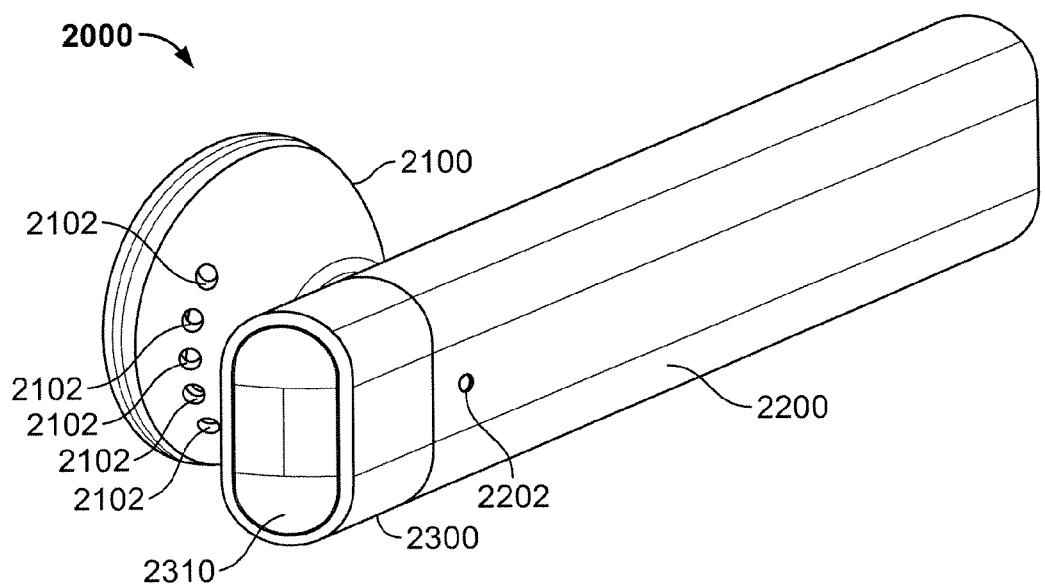

FIGS. 2A and 2B show perspective views of illustrative Bluetooth headset 2000 in accordance with an embodiment of this invention. Bluetooth headset 2000 can be used as wireless communication headset 110 of FIG. 1. Electrical, mechanical, and other components of headset 2000 can be enclosed in a housing, which can include a plurality of pieces that are assembled using any appropriate process, such as adhesive, screws, press fit, or any suitable combination thereof. Illustrative Bluetooth headset 2000 can include earbud body 1100, earbud neck 2110, tube 2200, button body 2300, and connector plate 2400.

Earbud body 2100 can include perforations (sometimes called acoustic ports) 2102 and 2104 that allow air to pass into and out of earbud body 2100. For example, front port 2104 can facilitate the passage of audio waves from a receiver located inside earbud body 2100 to the ear of a user. Side ports 2102, on the other hand, can facilitate the venting of acoustic pressure from inside earbud body 2100 to the surrounding air. Earbud body 2100 can be coupled to tube 2200 by neck 2110.

Tube 2200 can include one or more microperforations 2202. Button body 2300 can be coupled to tube 2200 and include button 2310, which a user can manipulate to control headset 2000. Connector plate 2400 can be coupled to the end of tube 2200 that is opposite button body 2300, and can include at least one acoustic port for a microphone operable to receive a user's voice, as well as at least one contact 2410 operable to be coupled to a cable for providing power, data, or both to headset 2000. In accordance with an embodiment of the invention, connector plate 2400 and contacts 2410 (which can be substantially level with the face of connector plate 2400) can be substantially recessed into tube 2200, as shown by recessed portion 2420. This recessed positioning can advantageously facilitate the coupling of connector plate 2400 and contacts 2410 with another connector (e.g., a connector at the end of a cable), where at least part of that other connector can be inserted into recessed portion 2420 to mate with connector plate 2400.

Earbud body 2100, earbud neck 2110, tube 2200, button body 2300, and connector plate 2400 can be constructed from any appropriate material including, for example, metal, plastic, silicone, rubber, foam, or any suitable combination thereof. As an example, earbud body 2100 can be formed from a plastic element surrounded by a silicone seal, and tube 2200 can be formed from aluminum. Similarly, earbud body 2100, earbud neck 2110, tube 2200, button body 2300, and connector plate 2400 can be manufactured using any appropriate process (e.g., molding, casting, extrusion, or any suitable combination thereof). For example, earbud body 2100, earbud neck 2110, tube 2200, button body 2300, and connector plate 2400 can be post-process cold-impressed to provide texture and other features on the inner surfaces of the bodies.

Figure 3:
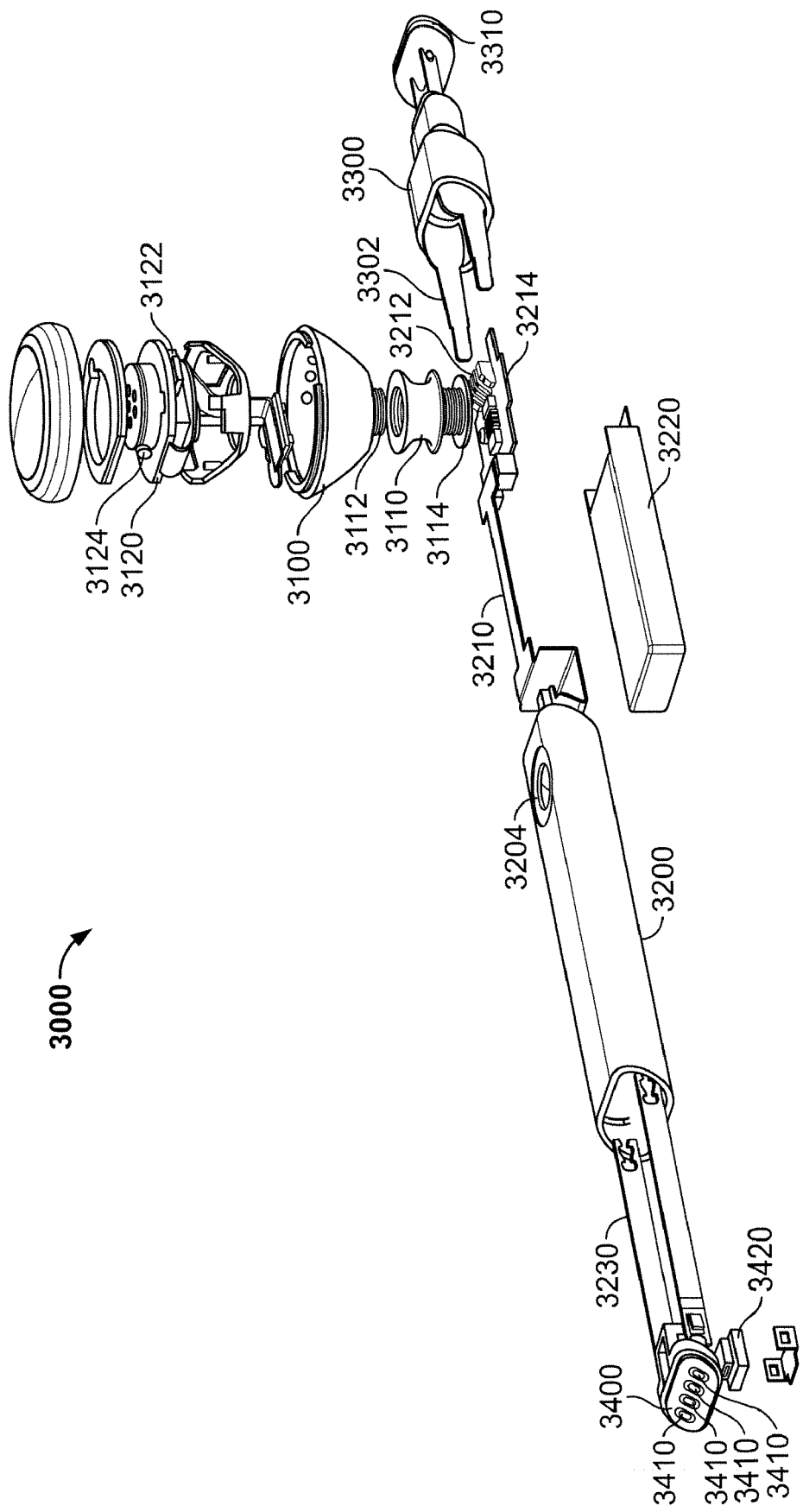
FIG. 3 is an exploded view of an illustrative Bluetooth headset in accordance with an embodiment of the invention.

FIG. 3 is an exploded view of illustrative Bluetooth headset 3000 in accordance with an embodiment of the invention. Bluetooth headset 3000 can be substantially similar to Bluetooth headset 2000 of FIG. 2. Headset 3000 can include earbud circuit board 3120, on which processor 3122 can be mounted for controlling the operation of headset 3000. Processor 3122 can be operable to perform any suitable function, including receiving, transmitting, decoding, encoding, or filtering audio data, or any suitable combination thereof. For example, processor 3122 can include wireless transceiver circuitry that is operable to wirelessly transmit and receive audio data to and from telephone 102 (e.g., using Bluetooth communication), possibly in conjunction with other suitable circuitry, such as antenna 3214 (described in greater detail later herein). Earbud circuit board 3120 can be electrically coupled to receiver 3124, and can be flexible so that it can be folded upon itself in order to occupy a three-dimensional volume. For example, earbud circuit board 3120 and receiver 3124 can both be placed in earbud body 3100, to reduce the footprint of tube 3200 and button body 3300.

Additional electronic components 3212 can be mounted on tube circuit board 3210. The size of headset 3000 can be reduced through appropriate distribution of electronic components between earbud circuit board 3120 and tube circuit board 3210.

Neck 3110 can be used to couple earbud body 3100 to headset tube 3200. In one embodiment, neck 3110 can be coupled to earbud body 3100 using screw 3112, and to headset tube 3200 using screw 3114. Neck 3110 can couple earbud body 3100 to tube 3200 in a manner that prevents earbud body 3100 and tube 3200 from undergoing rotation relative to each other.

Antenna 3214 can be used for wireless communications and can be located inside tube 3200. Antenna 3214 can be any appropriate antenna for communicating between headset 3000 and an electronic device (e.g., a telephone such as telephone 100 of FIG. 1). Tube circuit board 3210 and antenna 3214 can be electrically coupled to earbud circuit board 3120 by one or more wires (not shown) or any other suitable means.

A user can control the functions of headset 3000 using button 3310, which can be electrically coupled to tube circuit board 3210. Button 3310 can be coupled to button body 3300, which can include appendages 3302 for securing the housing in tube 3200. Button 3310 can extend outward from button body 3300 such that the button is positioned behind a user's ear when headset 3000 is in use. Button 3310 can be configured to move in any suitable manner including, for example, bending with respect to tube 3200, translating in and out of button body 3300, and rotating around an axis that passes through connector plate 3400 and button 3310.

Battery pack 3220 can be located within tube 3200, and can contain any appropriate battery or batteries, including lithium ion, lithium ion polymer (Li-Poly), nickel metal hydride, or any suitable combination thereof. Battery pack 3220 can be electrically coupled to tube circuit board 3210 for powering processor 3122, and to one or more of connector contacts 3410 for battery recharging. In order to decrease the size of battery pack 3220, and thereby reduce the size of headset 3000, circuitry that is typically packaged within standard battery packs can be moved to tube circuit board 3210.

Headset 3000 can also include microphone 3420 for receiving communications from a user. Microphone 3420 can be placed inside the end of tube 3400 that is farthest from earbud housing 3100. This end of tube 3400 is the portion of headset 3000 that is closest to the user's mouth. Headset 3000 can also include connector plate 3400, which can provide a surface for headset 3000 to connect with other devices. An opening (also sometimes called a "port") can be included in connector plate 3400 so that sound from a user's mouth can reach microphone 3420. Microphone 3420 and connector plate 3400 can be electrically coupled to circuit board 3210 in any suitable manner.

Connector plate 3400 can include apertures in which contacts 3410 can be inserted in order to facilitate the electrical coupling of headset 3000 to another device. Contacts 3410 can be substantially flush with the surface of connector plate 3400 so that the combination of the contacts and plate create a substantially flat surface for mating with other connectors. Connector plate 3400 can be made of a ferromagnetic material so that magnetic connectors, such as those shown in FIG. 8, for example, are magnetically biased to connector plate 3400. The design of connector plate 3400, contacts 3410, and complementary magnetic connectors will be described in more detail below in connection with the discussion of FIGS. 4-13.

Headset 3000 can include one or more brackets 3230 adapted to couple connector plate 3400 to antenna cap 3300. Brackets 3230 can prevent connector plate 3400 from moving axially away from antenna cap 3300, and can likewise prevent connector plate 3400 and antenna cap 3300 from separating from tube 3200. Alternatively, plate 3400 can be coupled to a bracket that is secured to the inner wall of tube 3200, and antenna cap 3300 can be coupled to a different bracket that is also secured to the inside of the tube.

In most headsets, the end containing the microphone is typically affixed to the headset body with an adhesive that seals the seam between the end and the headset body. By using brackets 3230, it is not necessary to use adhesive to secure connector plate 3400 in tube 3200. Because no adhesive is used, sound waves can leak in through the seam around plate 3400. In the event that a foreign object, such as dirt, were to clog the opening for microphone 3420, the leaked sound waves can still be picked up by microphone 3420. Alternatively, an adhesive can be applied to the seam if leaked sound waves cause problems with microphone 3420.

Figure 4:
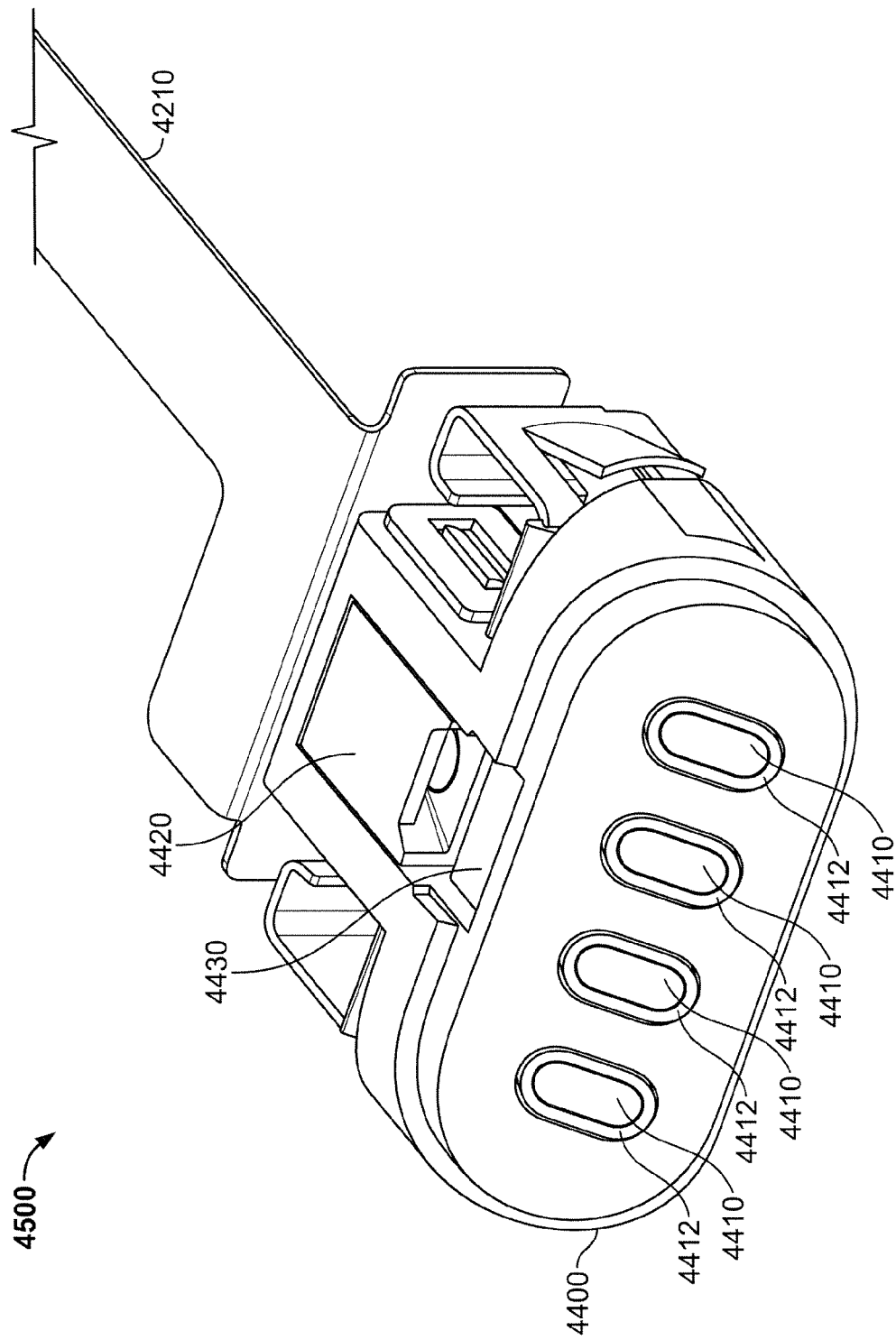
FIG. 4 is a perspective view of an illustrative Bluetooth headset connector assembly in accordance with an embodiment of the invention.

FIG. 4 is a perspective view of illustrative Bluetooth headset connector assembly 4500 in accordance with an embodiment of the invention. Connector assembly 4500 can include connector plate 4400, contacts 4410, and corresponding contact insulator 4412 to prevent contacts 4410 from electrically coupling to connector plate 4400. Wires (not shown) can be included in connector assembly 4500 to electrically couple contacts 4410 to tube circuit board 4210. Microphone port 4430 can be included in the top of connector plate 4400 to allow sound to reach microphone boot 4420. Microphone boot 4420 and a microphone (not shown) can be located behind connector plate 4400. The microphone (not shown) can be housed within microphone boot 4420 to, for example, protect the microphone from damage and control the flow of air into the microphone.

Figure 5:
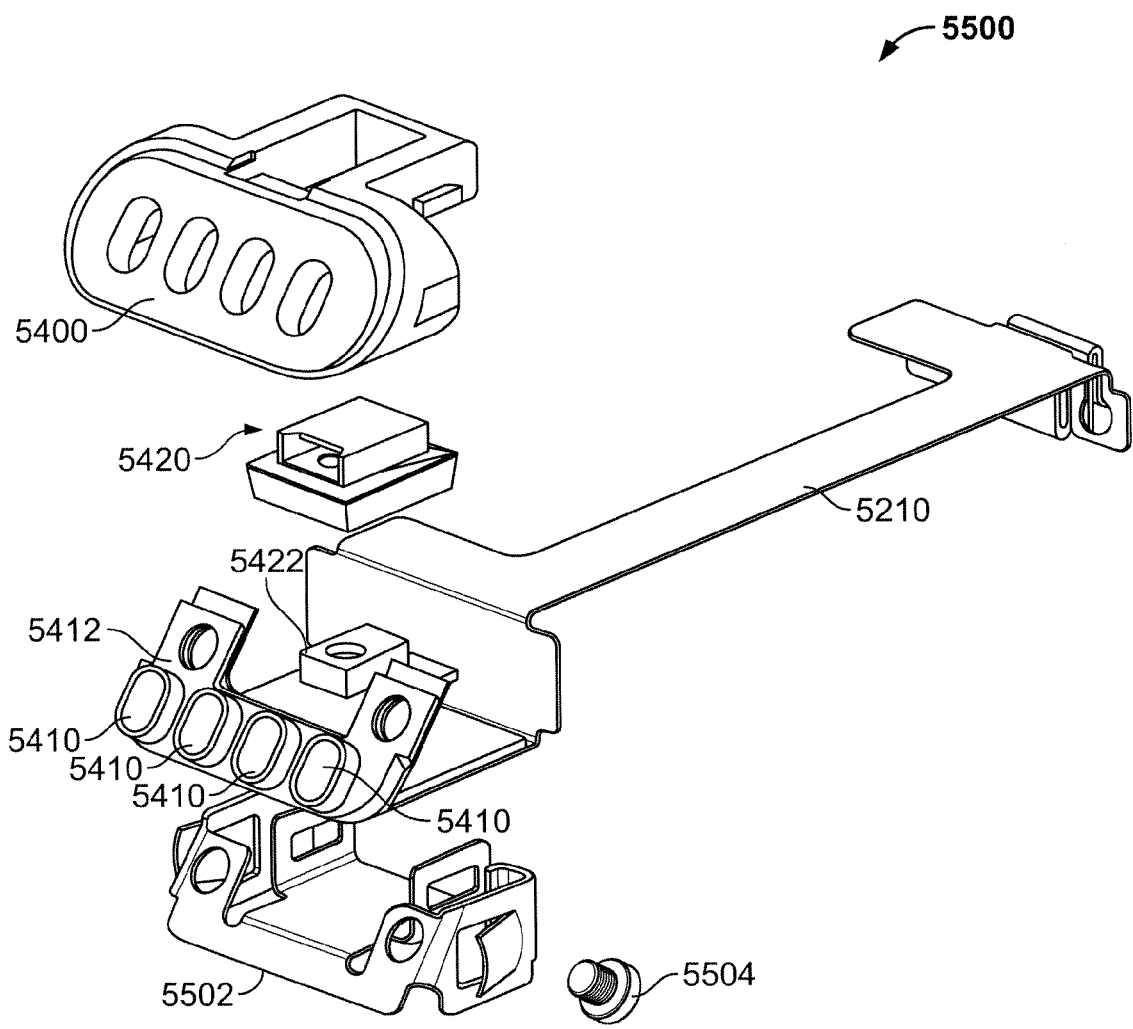
FIG. 5 is an exploded view of an illustrative Bluetooth headset connector assembly in accordance with an embodiment of the invention.

FIG. 5 is an exploded view of illustrative Bluetooth headset connector assembly 5500 in accordance with an embodiment of the invention. Connector assembly 5500, which can be substantially similar to connector assembly 4500 of FIG. 4, can include connector plate 5400, microphone boot 5420, microphone 5422, contacts 5410, contact insulator 5412, bracket 5502, and screws 5504. Microphone 5422 can be a MEMs microphone and can be electrically coupled to tube circuit board 5210. Microphone boot 5420 can be mounted over microphone 5422, and can be made of silicon so that it can seal with surrounding parts when connector assembly 5500 is assembled into one piece.

Contacts 5410 can be substantially encapsulated by contact insulator 5412 as shown. Contact insulator 5412 can be made of a nonconductive material, such as polycarbonate, for example, so that contacts 5410 are electrically isolated from connector plate 5400. Contact insulator 5412 can be mounted onto circuit board 5210 and can include wires (not shown), which can electrically couple contacts 5410 with circuit board 5210.

Bracket 5502 can be coupled to connector plate 5400 in order to hold connector assembly 5500 together. Upward pressure from bracket 5502 can compress microphone boot 5420 in order to create an acoustic seal for the passage of air into and out of microphone 5422. Circuit board 5210, contact insulator 5412, and bracket 5502 can include one or more apertures for mounting to connector plate 5400. Screws 5504, only one of which is shown, can be inserted through these apertures and screwed into threaded cavities (not shown) on the back of connector plate 5400.

Figure 6:
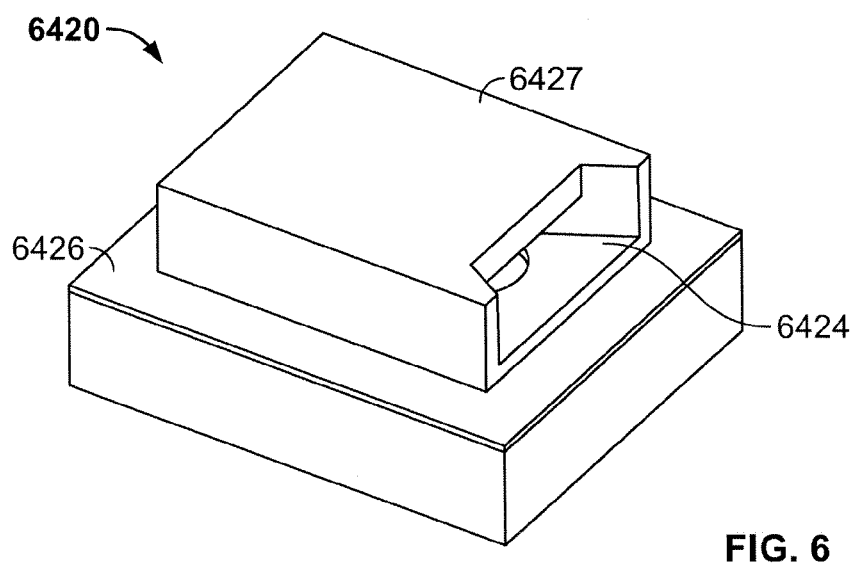
FIG. 6 is a perspective view of an illustrative Bluetooth headset microphone boot in accordance with an embodiment of the invention.

FIG. 6 is a perspective view of illustrative Bluetooth headset microphone boot 6420 in accordance with an embodiment of the invention. Microphone boot 6420 can include input aperture 6424. Air that flows into a headset by going around microphone boot 6420 can cause a noticeable loss in the quality of the audio signals picked up by a microphone (not shown). Therefore, microphone boot 6420 can include sealing surface 6426 in order to advantageously prevent air from leaking through any seams that are located around the edge of microphone boot 6420. Sealing surface 6426 can be a horizontal surface of boot 6240 that extends to the perimeter of the footprint of the boot. Sealing seams in this manner can direct the flow of air into aperture 6424, which can result in higher quality sound being received by the microphone (not shown).

Traditionally, the roof of a microphone boot is sealed to the surfaces of surrounding parts. This sealing can require a relatively thick boot roof that is structurally robust enough to support the pressure required to make an adequate seal. In the embodiment shown in FIG. 6, the horizontal sealing surface 6426 can be lower than roof 6427. Accordingly, roof 6427 can be relatively thin because it does not need to support the pressure of a seal. This reduced thickness can save space in a housing that contains microphone boot 6420, and can result in a generally smaller or thinner headset.

Figure 7:
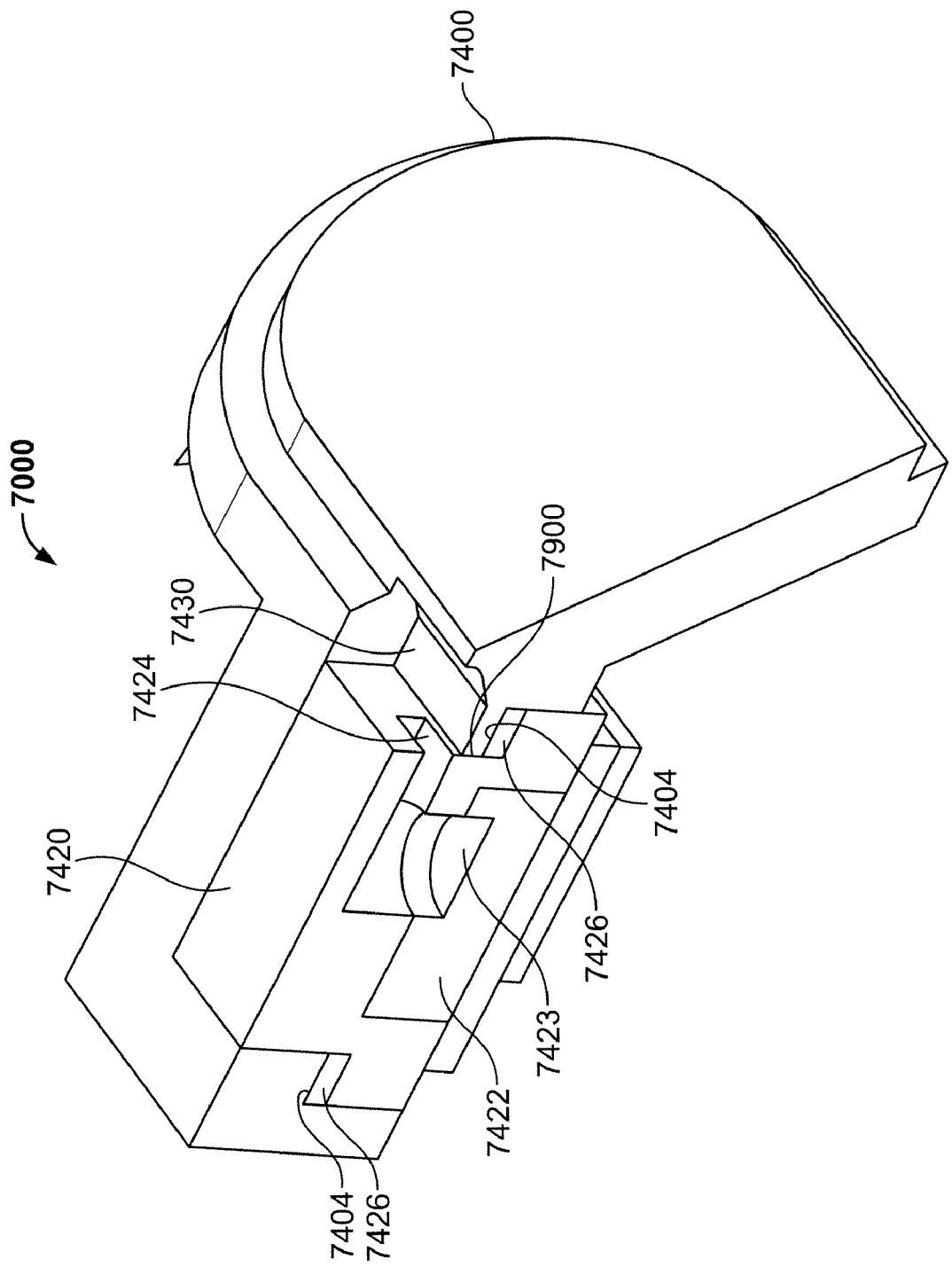
FIG. 7 is a perspective cross-sectional view of an illustrative Bluetooth headset connector plate assembly in accordance with an embodiment of the invention.

FIG. 7 is a perspective cross-sectional view of illustrative Bluetooth headset connector plate assembly 7000 in accordance with an embodiment of the invention. Connector plate assembly 7000 can include connector plate 7400, microphone boot 7420, and microphone 7422. These components can be assembled in such a way that air can pass through microphone port 7430, into boot aperture 7424, and reach microphone input 7423. Various modifications to illustrative connector plate assembly 7000 can be performed if desired. For example, suitably sized and shaped wind-screen mesh material can be coupled to microphone port 7430, in order to reduce the wind noise of incoming user audio input through microphone port 7430.

Because of the other elements (not shown) in the connector assembly, an illustrative set of which is described above in connection with FIG. 5, microphone 7422 and microphone boot 7420 can be pressed against connector plate 7400 when installed in a headset. The pressure at this contact can cause sealing surface 7426 to form a seal with surface 7404 of connector plate 7400. This seal can advantageously prevent air from passing through microphone port 7430 and through seam 7900, between connector plate 7400 and microphone boot 7420.

Figure 8:
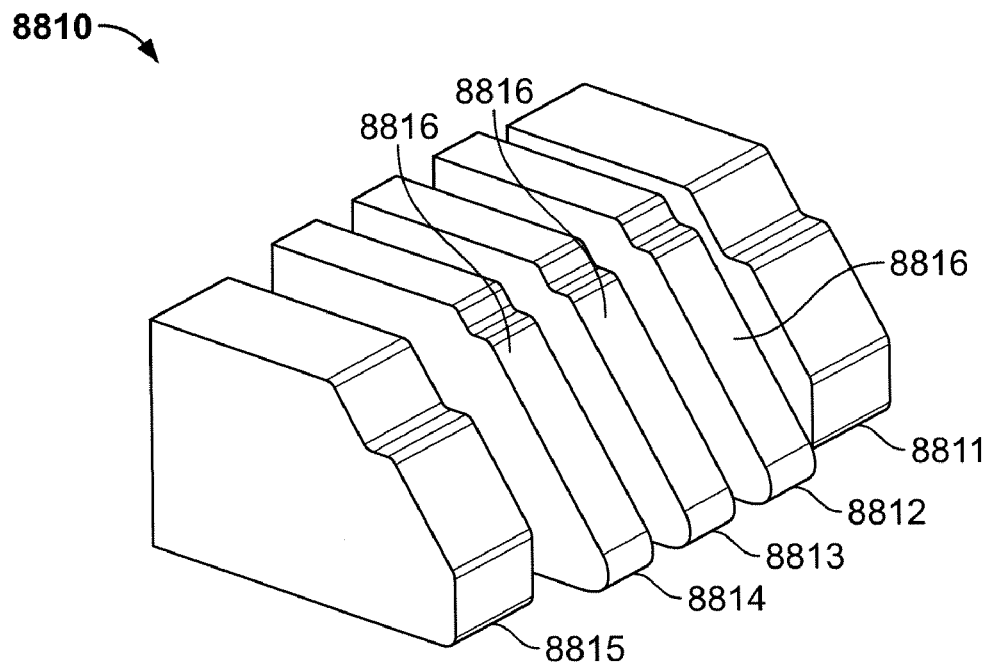
FIG. 8 is a perspective view of an illustrative magnetic array for use in a cable connector in accordance with an embodiment of the invention.

FIG. 8 is a perspective view of illustrative magnetic array 8810 for use in a cable connector in accordance with an embodiment of the invention. Array 8810 can include magnetic components 8811-8815, which can be made of a permanent rare-earth magnetic material or any other type of suitable material. For example, magnetic components 8811-8815 can be made of Neodymium magnets, such as N50 magnets. Magnetic components 8811-8815 can be shaped so that a substantially mating face 8816 is formed along one side. This mating face 8816 can, for example, be complementary to the angle of a headset's connector plate (not shown), as described in further detail below in connection with FIG. 9.

Figure 9:
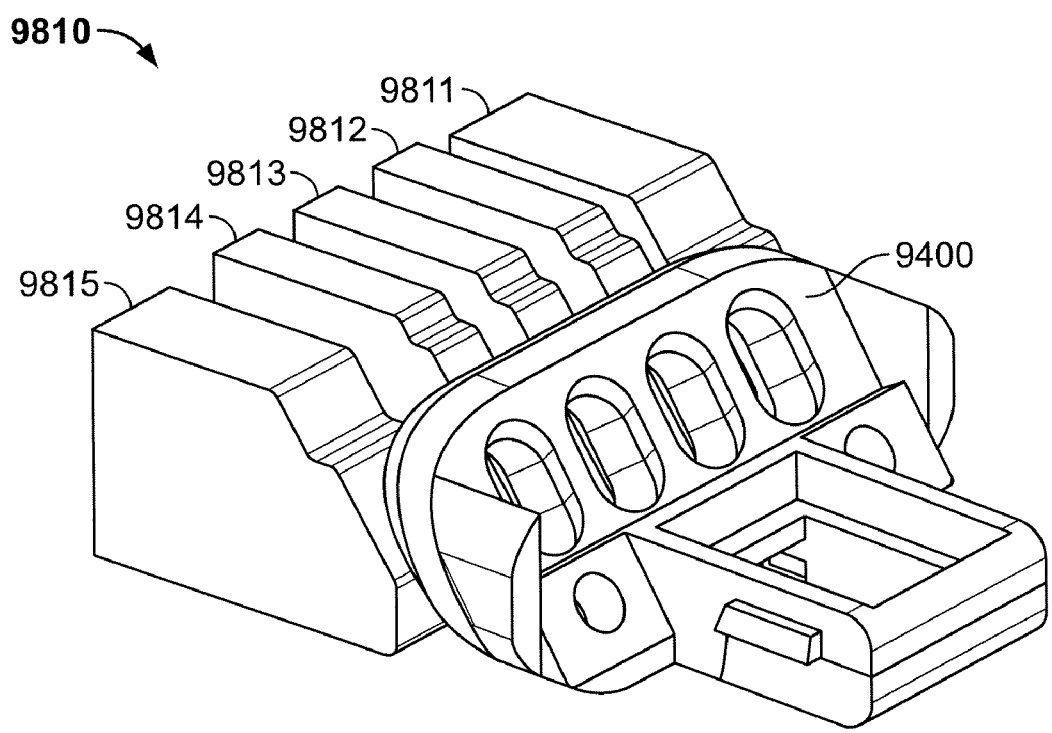
FIG. 9 is a perspective view of an illustrative magnetic array for use in a cable connector, aligned with an illustrative Bluetooth headset connector plate in accordance with an embodiment of the invention.

FIG. 9 is a perspective view of an illustrative magnetic array 9810 for use in a cable connector, aligned with an illustrative Bluetooth headset connector plate 9400 in accordance with an embodiment of the invention. If connector plate 9400 is made of a ferromagnetic material and array 9810 includes a plurality of permanent magnets, the magnetic fields of array 9810 can generate magnetic forces between plate 9400 and array 9810 If array 9810 is embedded within a connector that mates with plate 9400, these magnetic forces can reinforce the connection between the connector and plate 9400.

In order to maximize the magnetic field generated by array 9810, it can be advantageous to arrange magnetic components 9811-9815 so that the polarity of each component is in a particular orientation. For example, magnetic components 9811-9815 can be arranged so that the south pole of the outer two magnets are closest to the mating face, and the north pole of the inner three magnets are closest to the mating face. In this configuration, if one were to list the polarities encountered when passing horizontally over the mating face, the list would read south-north-north-north-south. This maximization of the magnetic field is one reason why it might be desirable to use an array of magnets, as opposed to a single large magnet.

While the embodiments described in this discussion include a ferromagnetic connector plate and an array of permanent magnets embedded in a complementary connector, it is contemplated that any other magnetic configurations can be used without deviating from the spirit of the present invention. For example, an electromagnetic element can be included in the connector plate in place of, or addition to, the ferromagnetic material. Similarly, a ferromagnetic material can be located in a complementary connector in place of, or in addition to, the permanent magnets.

Figure 10A:
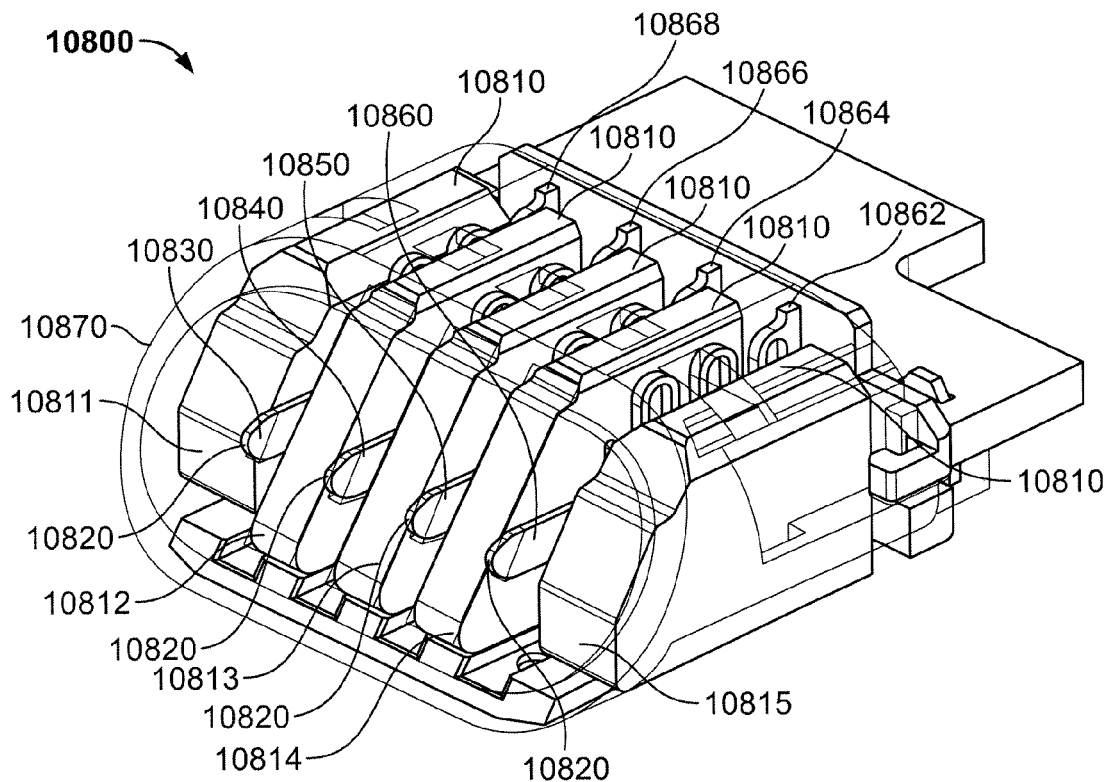
FIGS. 10A and 10B are perspective views of an illustrative cable connector assembly in accordance with an embodiment of the invention.
Figure 10B:
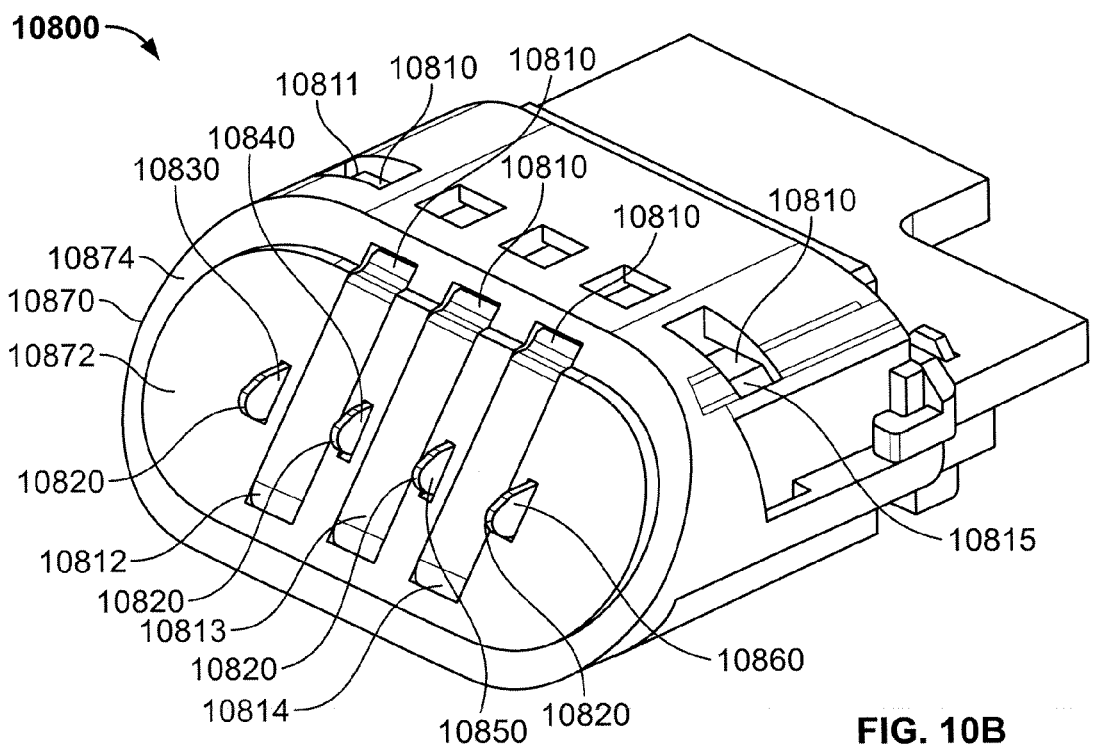

FIGS. 10A and 10B are perspective views of an illustrative cable connector assembly 10800 in accordance with an embodiment of the invention. Connector assembly 10800 is complementary to and capable of mating with a connector plate (not shown), such as connector plate 9400 of FIG. 9. Connector 10800 can be used in, for example, the cable of a charger (not shown) that charges a battery in a wireless communication headset.

The view of connector assembly 10800 in FIG. 10A does not include connector housing 10870 so that the location of magnetic array 10810 and contact array 10820 can be seen. Array 10810 of magnetic components can be embedded in connector assembly 10800 so that the surface of magnetic components 10812, 10813, and 10814 can be flush with a mating face of a connector plate (not shown), such as the outward face of connector plate 9400 of FIG. 9. These exposed magnetic components can extend up to the surface of the mating connector plate (not shown), in order to maximize the strength of the magnetic forces between magnetic components 10812-10814 and the surface of the connector plate (not shown). However, a connector with no exposed magnetic elements would not deviate from the spirit of the present invention. For example, magnetic components 10811 and 10815 can be recessed in order to reduce the size of connector assembly 10800.

An array 10820 of contacts 10830, 10840, 10850, and 10860 can be included in connector assembly 10800. In order to integrate contact array 10820 with magnetic array 10810, each contact can be placed in the gap between a pair of adjacent magnetic components. In this manner, contact 10830 can be located in between magnetic components 10811 and 10812, contact 10840 can be located between components 10812 and 10813, etc. This integrated distribution of contacts, which is enabled through the use of multiple magnetic components that are spaced apart from each other as opposed to a single large magnet, can advantageously permit the size of connector assembly 10800 to be relatively small.

Each contact in contact array 10820 can include a spring mechanism, such as coil 10862 of contact 10860. Coil 10862 can bias contact tip 10860 to extend out of connector housing 10870. Coils 10862, 10864, 10866, and 10868 can be substantially planar, or flat. Substantially planar coils can allow for minimal spacing between magnetic components 10811-10815, which can in turn result in a relatively small connector. However, other types of coils and contacts can be used in accordance with the principles of the present invention. For example, cylindrical springs biasing respective cylindrical contacts (commonly called "pogo pins") can be used instead.

Contact array 10820 can be positioned to electrically couple to, for example, the contacts located on the face of a connector plate of a headset (not shown), such as contacts 2410 of FIG. 2A. Connector housing 10870 can include an elevated face 10872, which can fit into a cavity of a complementary connector. For example, if connector 10800 were to mate with headset 2000 of FIGS. 2A and 2B, elevated face 10872 could fit against recessed connector plate 2400, while the edge of tube 2200 could fit against perimeter 10874 of connector 10800. In this mating configuration, contact tips 10830, 10840, 10850, and 10860 can be electrically coupled to contacts 2410 of headset 2000.

In accordance with an embodiment of the invention, connector assembly 10800 can include contacts (not shown) on the rear of housing 10870 so that connector assembly 10800 can be electrically coupled to other circuitry (not shown). For example, connector assembly 10800 can be operable to transmit electrical power to or from a headset through one or more contacts in contact array 10820, which can advantageously prolong the operating time of the headset by supplementing the power supplied by the headset's battery pack with power from an external source, by recharging the headset's battery pack, or both. Similarly, connector assembly 10800 can be operable to transmit audio data to or from a headset through one or more contacts in array 10820, communicating that audio data to or from a corresponding device (e.g., a cellular telephone that operates in conjunction with the headset).

One potential disadvantage of using connector assembly 10800 in conjunction with a headset connector plate assembly, such as connector plate assembly 7400 of FIG. 7, is that connector assembly 10800 can substantially obstruct the airflow into at least one air channel of the connector plate assembly. For instance, aligning face 10872 of connector assembly 10800 with connector plate 7400 (which can be recessed inside a tube of a headset) can substantially block air and sound from entering microphone port 7430 and microphone boot aperture 7424. Such blocking can result in substantially less or lower-quality audio signals being received by microphone 7422. In accordance with embodiments of the invention, the structure of connector assembly 10800 can be modified in order to facilitate a free flow of air when connector assembly 10800 is mated against a complementary headset connector plate assembly, such as assembly 7400 of FIG. 7. Further details of the structure and operation of such illustrative connectors of the invention are described below in connection with FIGS. 11A-13.

Figure 11A:
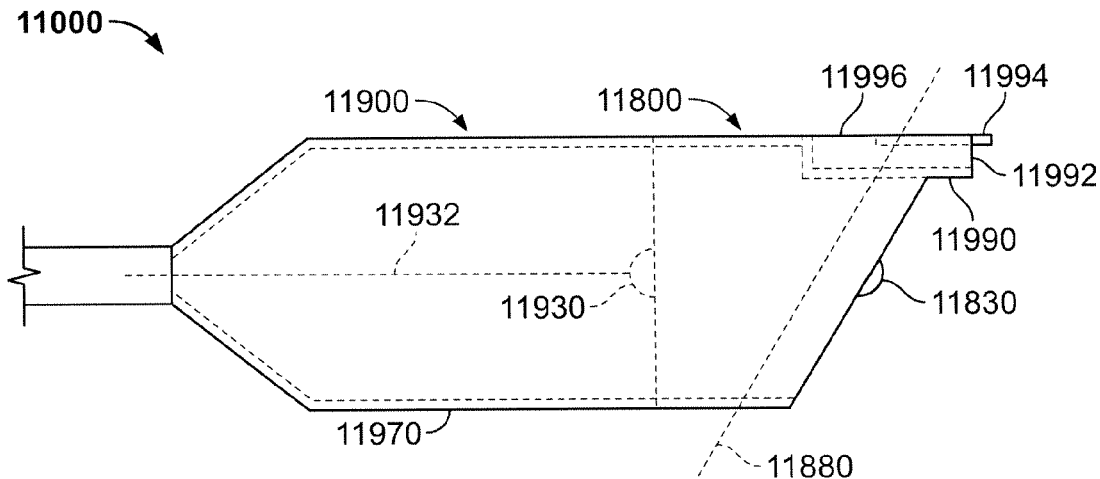
FIGS. 11A and 11B are, respectively, side and top views of an illustrative cable connector in accordance with an embodiment of the invention.
Figure 11B:
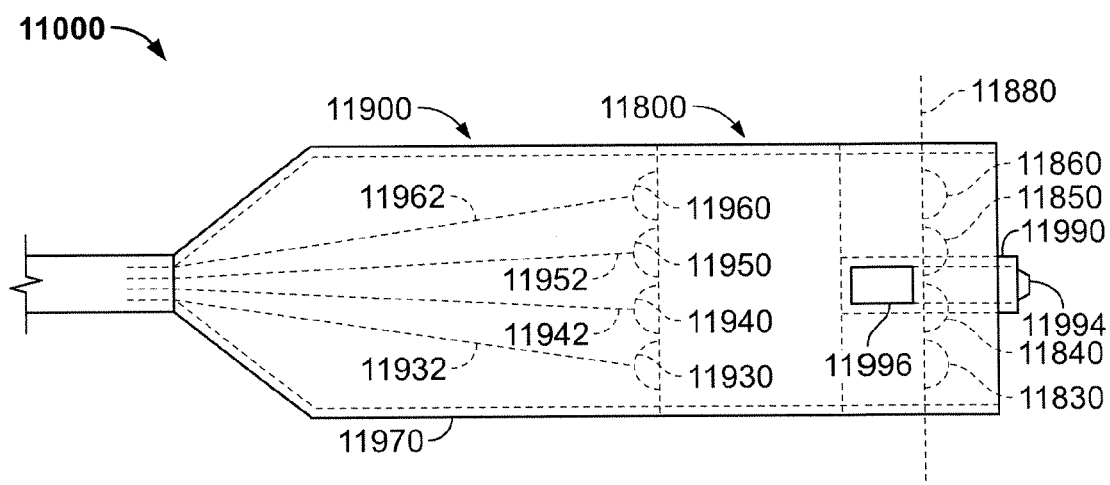

FIGS. 11A and 11B are, respectively, side and top views of illustrative cable connector 11000 in accordance with an embodiment of the invention. In FIGS. 11A and 11B, certain structures that are located inside housing 11970 are represented by dashed lines. Cable connector 11000 can be used as connector 108 of FIG. 1 to electrically couple wireless communication headset 110 to telephone 102 through cable 106. Connector 11000 can include connector body 11900 and connector assembly 11800, which can include some or all the features of the connector structures illustrated in FIGS. 8-10B. For example, connector assembly 11800 can be substantially similar to connector assembly 10800, illustrated in FIGS. 10A and 10B, which can include magnetic array 10810 interleaved with contact array 10820. Some of these features have been omitted from FIGS. 11A and 11B for clarity of illustration. For example, contact 11830 can extend inward in a substantially planar coil that terminates in corresponding rear contact 11930, as described in connection with contact 10830 and coil 10868 of FIG. 10A. It will be understood that any or all such features can be included in connector assembly 11800 in accordance with embodiments of the present invention. In addition, connector assembly 11800 can include features that are not present in connector assembly 10800, as discussed below.

Connector assembly 11800 can advantageously include acoustic tunnel 11990, which can be adapted to extend substantially outward beyond the distal face of connector assembly 11800, in order to align with the tip of the microphone boot of a headset connector plate assembly (not shown), such as either of microphone boots 4420 and 7420, depicted in FIGS. 4 and 7, respectively. In particular, notched tip 11994 of acoustic tunnel 11990 can be shaped to mate with the corresponding notched recess of the microphone boot, such as the notched recess of microphone boot 4420 of FIG. 4.

When cable connector 11000 is coupled to a headset connector plate, such as connector plate 2400 of FIG. 2A, a portion of cable connector assembly 11800 can extend into a recessed portion of the headset tube, such as recessed portion 2420 of tube 2200, shown in FIG. 2. Dotted line 11880 in FIGS. 11A and 11B can demarcate the approximate edge of the headset tube, which can be substantially parallel to the front face of cable connector assembly 11800, and offset toward the proximal end of cable connector 11000. Acoustic tunnel aperture 11996, which is positioned closer to the proximal end of cable connector 11000, can be exposed to open air while cable connector 11000 is coupled to a corresponding connector plate assembly of a headset. This positioning can advantageously allow sound from a user's voice to enter acoustic channel 11990 through aperture 11996 and exit through aperture 11992, leading into the microphone boot of the corresponding headset (e.g., microphone boot 4420 or 7420 of FIG. 4 or 7, respectively).

Thus, acoustic tunnel 11990 can advantageously permit cable connector 11900 to be coupled to a complementary headset connector plate assembly (e.g., assembly 7000 of FIG. 7) without obstructing the airflow through the microphone port (e.g., port 7430 of FIG. 7) and the microphone boot aperture (e.g., aperture 7424 of FIG. 7) of that headset connector plate assembly. If necessary, any suitable portion of the headset connector plate assembly can be modified to facilitate the coupling of acoustic tube 11990 with the microphone boot of the headset connector plate assembly. For instance, the edge of connector plate 7400 that is substantially in front of microphone port 7430 and microphone boot aperture 7424 of FIG. 7 can be lowered, reshaped, or otherwise modified to facilitate entry of acoustic tube 11990 into headset connector plate assembly 7000. Advantageously, acoustic tunnel 11990 and cable connector housing 11970 can be sized and shaped so that a substantially airtight seal is formed between acoustic tunnel 11990 and its complementary microphone boot when they are coupled to each other, substantially preserving the quality of the sound that passes through the channel formed by acoustic tunnel 11990 and the microphone boot.

When cable connector 11000 is coupled to a complementary headset connector plate assembly (e.g., connector plate assembly 4500 of FIG. 4), contacts of cable connector 11000 can be electrically coupled to corresponding contacts of that connector plate assembly. For example, contact 11830 of cable connector 11000 can be electrically coupled to rightmost contact 4410 of connector plate assembly 4500 of FIG. 4. Similarly, each of contacts 11840, 11850, and 11860 can be electrically coupled to a corresponding contact of connector plate assembly 4500 of FIG. 4. Contacts 11830, 11840, 11850, and 11860 can extend proximally into cable connector assembly 11800 in any suitable fashion (e.g., substantially straight, in planar coils, in cylindrical springs, or any suitable combination thereof) toward respective leads 11930, 11940, 11950, and 11960. Leads 11930, 11940, 11950, and 11960 can, in turn, be electrically coupled to respective wires 11932, 11942, 11952, and 11962, which can extend through connector body 11900 into the attached cable.

In accordance with an embodiment of the invention, any or all of wires 11932, 11942, 11952, and 11962 can be used to carry electrical power to a wireless communication headset from an associated device (e.g., a cellular telephone) by delivering the power through the appropriate contacts, selected from among contacts 11830, 11840, 11850, and 11860. In some embodiments of the invention, outermost wires 11962 and 11932 can be used to carry electrical power and ground signals from a cellular telephone to a Bluetooth headset. In other embodiments, only one wire is needed to carry electrical power, while electrical ground is carried by housing 11970 of cable connector 11000. The ability to transfer power from a telephone to a wireless headset through a cable using connector 11000 can allow a user to use the wireless headset even after the power in a battery pack of the headset has dropped below a minimum voltage threshold, where dropping below the minimum voltage would normally preclude operation (or at least full operation) of the wireless headset. In this way, a user can advantageously avoid or prolong the need to recharge the headset using an electrical outlet (e.g., with docking station 112 of FIG. 1). Additionally, the ability the draw power from a telephone can advantageously facilitate the use of the wireless headset during relatively long telephone calls, during which the battery life of a wireless headset relying entirely on its internal battery pack would be exceeded. Such features can be provided while maintaining a relatively small form factor for the wireless headset, providing relatively good user comfort and aesthetics. The wireless headset can continue to transmit voice data to and from the corresponding telephone using any appropriate communication means (e.g., Bluetooth wireless communication) while power is being supplied to the headset.

In accordance with an embodiment of the invention, any or all of wires 11932, 11942, 11952, and 11962 can be used to carry audio data between a wireless communication headset and an associated device (e.g., a cellular telephone) by transmitting the data through the appropriate contacts, selected from among contacts 11830, 11840, 11850, and 11860. In some embodiments of the invention, innermost wires 11952 and 11942 can be used to carry data to and from the wireless headset. For instance, one of wires 11952 and 11942 can be used substantially exclusively for transmitting audio data to the wireless headset, while the other of wires 11952 and 11942 can be used substantially exclusively for transmitting audio data from the wireless headset. Alternatively, both wires 11952 and 11942 can be used for bidirectional communication between the telephone and the wireless headset. The audio data can be transmitted using any suitable communication means (e.g., using USB protocols, serial data transfer protocols, or any other suitable standards). The ability to transfer audio data between a telephone and a wireless headset through a wired cable connection using connector 11000 can allow a user to carry on a conversation using the telephone even in the presence of interference, noise, jitter, or any other impediments to successful wireless data communication between the telephone and the wireless headset.

Thus, the use of cable connector 11800 to couple a telephone to a wireless headset through a cable can advantageously allow power, data, or both to be transferred between the telephone and the wireless headset. In addition, acoustic tunnel 11990 can allow airflow into a microphone boot of a complementary headset connector plate assembly (e.g., microphone boot 4420 or 5420 of FIG. 4 or FIG. 5, respectively) while cable connector 11800 is mated with the connector plate assembly. It will be understood that variants of illustrative connector 11000 shown in FIGS. 11A and 11B can be practiced without deviating from the spirit of the invention. For example, although four wires 11932, 11942, 11952, and 11962 are shown in FIGS. 11A and 11B, any suitable number of wires (e.g., 2 or 1) can be used to transmit either or both of audio data and power, while reducing the weight and size of cable connector 11000. Similarly, the size, shape, positioning, or any combination thereof of acoustic tunnel 11990 can be varied while still maintaining the advantages of the invention described above (e.g., at least part of acoustic tube 11990 can be substantially curved).

Figure 12A:
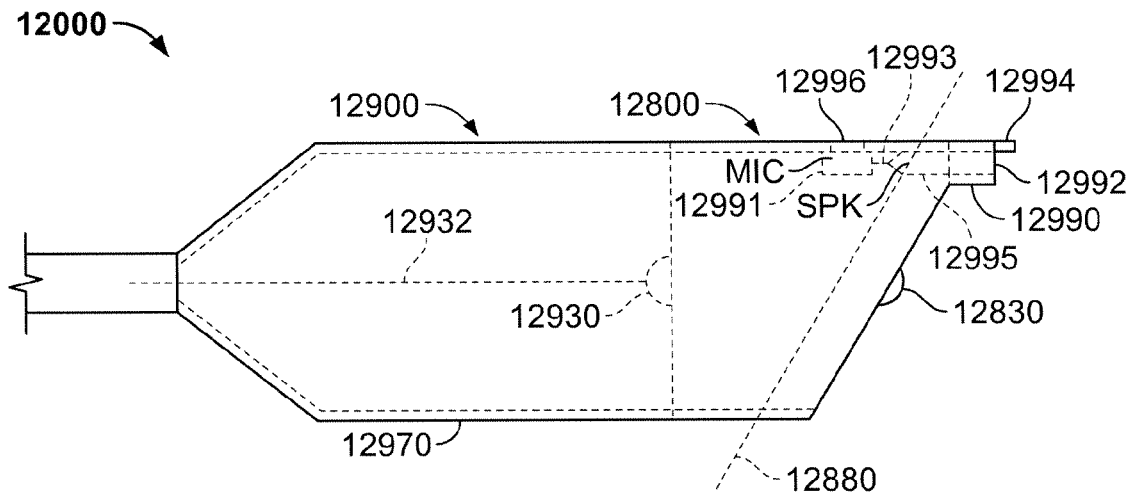
FIGS. 12A and 12B are, respectively, side and top views of another illustrative cable connector in accordance with an embodiment of the invention.
Figure 12B:
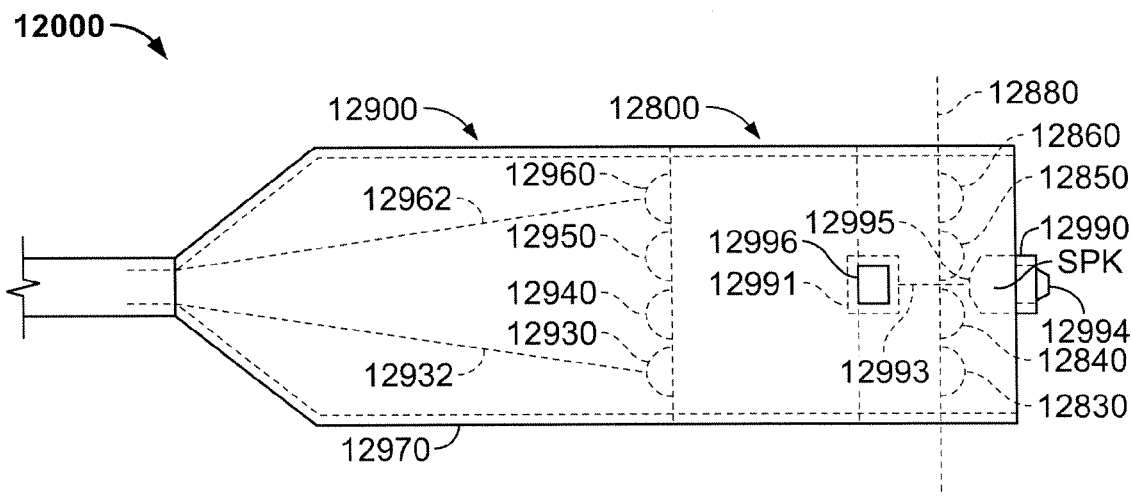

FIGS. 12A and 12B are, respectively, side and top views of another illustrative cable connector 12000 in accordance with an embodiment of the invention. In FIGS. 12A and 12B, certain structures that are located inside housing 12970 are represented by dashed lines. Cable connector 12000 can be used as connector 108 of FIG. 1 to electrically couple wireless communication headset 110 to telephone 102 through cable 106. Cable connector 12000 can be similar to cable connector 11000 in many respects, and similar elements are referenced by numerals that differ by 1000 between FIGS. 11A and 12A, and between FIGS. 11B and 12B. For simplicity of discussion, it is not deemed necessary to repeat the description of such similar elements, and instead, discussion of cable connector 12000 will be focused primarily on aspects of cable connector 12000 that are different from cable connector 11000.

Cable connector 12000, like cable connector 11000, can include acoustic tunnel 12990, which can be adapted to extend substantially outward beyond the distal face of connector assembly 12800 in order to align with the tip of the microphone boot of a headset connector plate assembly (not shown), such as either of microphone boots 4420 and 7420, depicted in FIGS. 4 and 7, respectively. However, in contrast to acoustic tunnel 12990, acoustic tunnel 12990 does not extend proximally beyond dotted line 12880, which marks the approximate edge of the headset tube when cable connector 12000 is coupled to a complementary connector assembly of the headset. Accordingly, aperture 12996, which is positioned proximally beyond dotted line 12880 and is adapted to receive sound from the speech of a user, can be coupled to acoustic tunnel 12990 through microphone 12991, wire 12993, and speaker 12995.

Microphone 12991 can be any suitable microphone, such as microphone 7422 of FIG. 7, used in a wireless communication headset, some variant thereof, or a substantially smaller microphone. Microphone 12991 can be aligned substantially below and against aperture 12996, forming a substantially airtight seal with the edges of aperture 12996 so that sounds received through aperture 12996 do not leak into other portions of cable connector assembly 12800, but rather are substantially captured by microphone 12996, thereby producing relatively good audio reception. Microphone 12996 can communicate received audio data or any appropriate data corresponding to that received audio data (e.g., a filtered or compressed version) to speaker 12995, which can substantially repeat the received audio data into acoustic tunnel 12992.

Speaker 12995 can include any appropriate circuitry or mechanical components, including electrical amplifiers, buffers, or repeaters, and can be similar to a speaker in a wireless headset that cable connector 12000 is adapted to couple to, or can be any other suitable speaker. In some embodiments of the invention, speaker 12995 can be substantially smaller than the wireless headset speaker, as speaker 12995 does not need to output audio at a volume that is suitable for human hearing, but rather, only needs to relay the audio to the wireless headset speaker for subsequent projection by that headset speaker to the user. Speaker 12995 can be positioned substantially flush against the proximal edges of acoustic tunnel 12990, such that the audio signals projected from microphone 12996 can be transmitted substantially without degradation through acoustic tunnel 12990, into a microphone boot of a headset connector plate assembly (e.g., microphone boot 4420 of headset connector plate assembly 4500 of FIG. 4) to which cable connector assembly 12800 is coupled. Accordingly, cable connector 12000 can rely not only on the receipt of audio data through aperture 12996 to ensure that the data is conveyed to the microphone of an appropriate wireless headset, but can also substantially prevent degradation of that audio data by repeating it through speaker 12995. Microphone 12991 and speaker 12995 can be powered through any suitable means (e.g., through a battery located in cable connector 12000, or through wires coupled to any of contacts 21960, 21950, 21940, and 12930).

Various modifications to cable connector 12000 can be performed if desired. For example, additional circuitry can be coupled to microphone 12991, speaker 12995, or both to perform noise cancellation, echo cancellation, audio amplification, or any other suitable function or combination thereof. Power for such additional circuitry can be supplied through any suitable means (e.g., through a battery located in cable connector 12000, or through wires coupled to any of contacts 21960, 21950, 21940, and 12930).

It will be noted that, in contrast to the illustrative embodiment depicted in FIGS. 11A and 11B, illustrative cable connector 12000 includes only two wires 12962 and 12932 for transferring electrical signals between a telephone and a wireless communication headset, using respective electrical contacts 12860 and 12830. In this embodiment, wires 12962 and 12932 can be used as a source of power for the wireless headset to which cable connector 12000 can be coupled. In such a mode, the wireless headset can still rely substantially on wireless communication to transmit audio data to and receive audio data from a corresponding telephone, using any appropriate means (e.g., Bluetooth communication). Alternatively, wires 12962 and 12932 can be used for transmitting audio data back and forth between the telephone and the wireless audio headset, in which case the wireless headset can rely on its internal battery pack for power. In yet another embodiment, one of wires 12962 and 12932 can be used to transmit power from the telephone to the wireless headset (e.g., by relying on housing 12970 as a reference for electrical ground) and the other of wires 12962 and 12932 can be used to transfer audio data between the telephone and the wireless headset (e.g., bidirectional communication can be achieved through a single wire by way of an appropriate communication protocol). Using two wires instead of four can advantageously reduce the size and weight of cable connector 12000 and its associated cable, providing greater ease of use and reducing the chance that cable connector 12000 will be decoupled from the wireless headset (e.g., a greater force will be required to break a magnetic coupling that can be established between cable connector 12000 and the corresponding wireless headset). In another embodiment, cable connector 12000 (or any other cable connector of the invention) can include only one wire, which can be coupled to any of contacts 12930, 12940, 12950, and 12960, and which can be adapted to transfer power or audio data between a wireless headset and a telephone.

Figure 13:
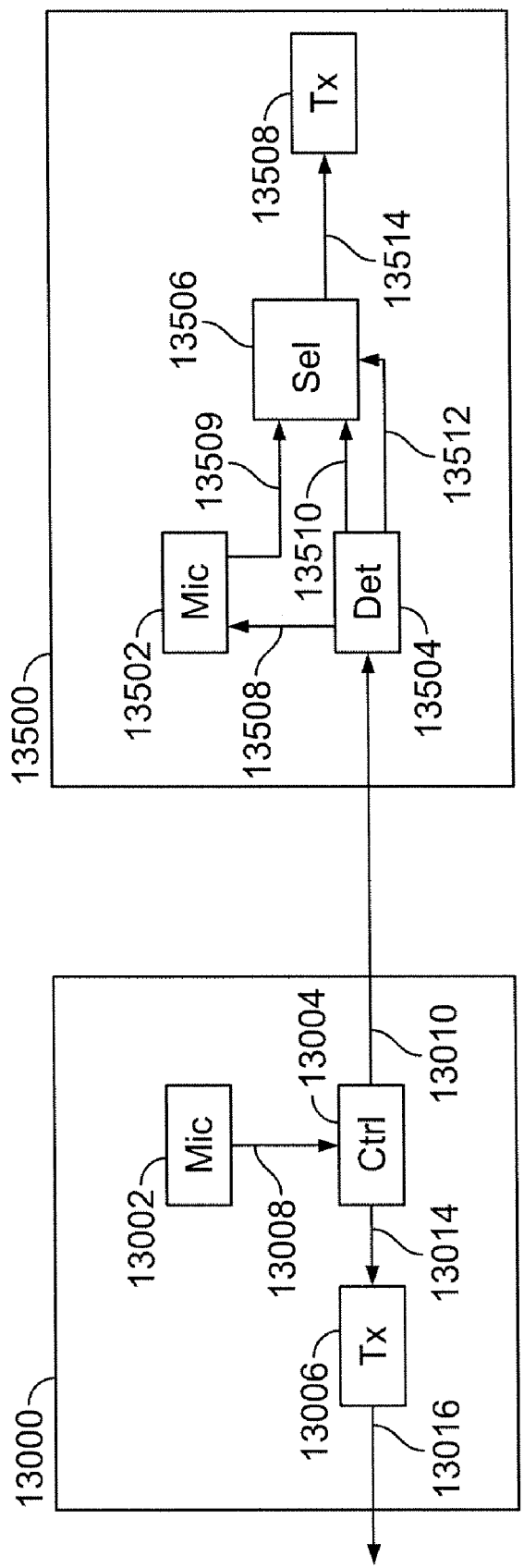
FIG. 13 is a block diagram of illustrative circuitry for use in a cable connector and an associated wireless communication headset in accordance with an embodiment of the invention.

FIG. 13 is a block diagram of illustrative circuitry for use in a cable connector 13000 and an associated wireless communication headset 13500 in accordance with an embodiment of the invention. Cable connector 13000 can be used as connector 108 of FIG. 1, and wireless communication headset 13500 can be used as headset 110 of FIG. 1. Cable connector 13000 can include some or all the features of the connector structures illustrated in FIGS. 8-12B. For example, microphone 13002 of cable connector 13000 can be placed substantially below and flush against the perimeter of an aperture at the top of cable connector 13000, as depicted in connection with microphone 12991 and aperture 12996 of cable connector 12000. Similarly, wireless communication headset 13500 can include any or all of the features of the headset structures illustrated in FIGS. 2A-7.

Cable connector 13000 can include microphone 13002, control circuitry 13004, and transmission circuitry 13006. Microphone 13002, which can be any suitable microphone, including any structures that can be used in microphone 12991, can be operable to receive audio input from a person's voice while cable connector 13000 is coupled to wireless headset 13500 (e.g., through the coupling of magnetic components on cable connector 13000 to ferromagnetic material of a connector plate assembly of wireless headset 13500). This audio data can be transmitted to control circuitry 13004 through output 13008. Control circuitry 13004 can include any appropriate circuitry, including programmable logic, embedded or hardwired logic, analog circuitry, memory, or some combination thereof, and be adapted to perform a variety of functions.

For instance, when cable connector 13000 is first coupled to wireless headset 13500, control circuitry can send control signals (e.g., a pre-designated pattern of electrical signals, such as binary "1"s and "0"s) through output 13010 (e.g., passing through any one or more electrical contacts of a cable contact array such as array 10810 of FIGS. 10A and 10B) to detection circuitry 13504 (e.g., passing through any one or more electrical contacts of a headset contact array, such as array 4410 of FIG. 4). Detection circuitry 13504 can include any appropriate circuitry, including programmable logic, embedded or hardwired logic, analog circuitry, memory, or some combination thereof. In accordance with an embodiment of the invention, detection circuitry 13504 can be operable to receive and detect the control signals sent by control circuitry 13004 and, in response, at least partially disable microphone 13502 of wireless headset 13500 via output 13508 of detection logic 13508. This disabling can occur by substantially preventing power from reaching microphone 13502 of wireless headset 13500, by allowing microphone 13502 to continue to receive audio signals but disabling any suitable outputs of microphone 13502, or by any other suitable means. By disabling microphone 13502 of wireless headset 13500, detection circuitry 13504 can allow microphone 13002 of cable connector 13002 to function as the primary audio input microphone of the system, which can receive voice data from a user for transmission to a corresponding telephone, such as telephone 102 of FIG. 1.

Transmission of the audio data received by microphone 13002 to a telephone can occur in various ways. For example, control circuitry 13014 can be operable to forward the audio data received from microphone 13008 (or some data corresponding to the audio data, such as a compressed or filtered version of the audio data) to transmission circuitry 13006 via output 13014. Transmission circuitry 13006, in turn, can be operable to convert the data to an appropriate format (if necessary) and transmit the converted audio data to the telephone via output 13016, which can be coupled to the cable of cable connector 13000. For example, transmission circuitry 13006 can be operable to transmit audio data to a telephone using USB data transmission, serial data transmission, or any other suitable communication protocol. As another example, transmission circuitry 13006 can transmit the audio data to the telephone using a wireless transmission protocol, such as Bluetooth, if appropriate (e.g., because the cable providing a wired connection between cable connector 13000 and the telephone is reserved exclusively for supplying power to wireless headset 13500).

Alternatively, the audio data can be sent from transmission circuitry 13508, which is located on wireless headset 13500 and which can include any appropriate circuitry, such as antenna 3214 of FIG. 3. Transmission circuitry 13508 can be operable to receive audio data from selection circuitry 13506 via output 13514. Selection circuitry 13506 can be controlled by output 13512 of detection circuitry 13510, which can select between a plurality of available audio signals, such as output 13509 of microphone 13502 and output 13510 of detection circuitry 13504. In an embodiment of the invention, detection circuitry 13504 can select output 13509 of microphone 13502 for output to transmission circuitry 13508 while wireless headset 13500 is not coupled to cable connector 13000. After wireless headset 13500 is coupled to cable connector 13000, detection circuitry 13504 can select output 13510 of detection circuitry 13510 for output to transmission circuitry 13508, in response to receiving control signals from control circuitry 13010 indicating that microphone 13502 of headset 13500 is to be disabled. After this disabling occurs, control circuitry 13004 can forward audio data received from microphone 13002 to detector circuitry 13504 (performing any appropriate processing prior to or during the transmission, such as filtering, encoding, or both), which can in forward send the audio data (again, with any appropriate processing) through selector circuitry 13506 to transmission circuitry 13508 via output 13514. Selection circuitry 13506 can include multiplexer circuitry, switching circuitry, latches, registers, or any other suitable circuitry or suitable combination thereof. Transmission circuitry 13508 can then transmit the audio data (again, with any appropriate processing, such as encoding the data in accordance with Bluetooth wireless communication standards) to a telephone associated with wireless communication headset 13500.

As seen above, cable connector 13000 and wireless communication headset 13500 can advantageously transmit audio data received through cable connector 13000 directly to a telephone through a wired cable connection using transmission circuitry 13006, without having to transmit the audio data to audio communication headset 13500. During such a transmission mode, microphone 13502 of wireless communication headset 13500 can be disabled to conserve power. Alternatively, instead of relying on a wired transmission to send audio data, wireless headset 13500 can transmit audio data received through microphone 13002 to a telephone using wireless (e.g., Bluetooth) communication, in a mode where microphone 13502 can still be disabled in order to save power. The use of control circuitry 13004 and detection circuitry 13504 can advantageously detect when cable connector 13000 is coupled to wireless headset 13500, and enable microphone 13002 and disable microphone 13500 in response to detecting such coupling.

Figure 14A:
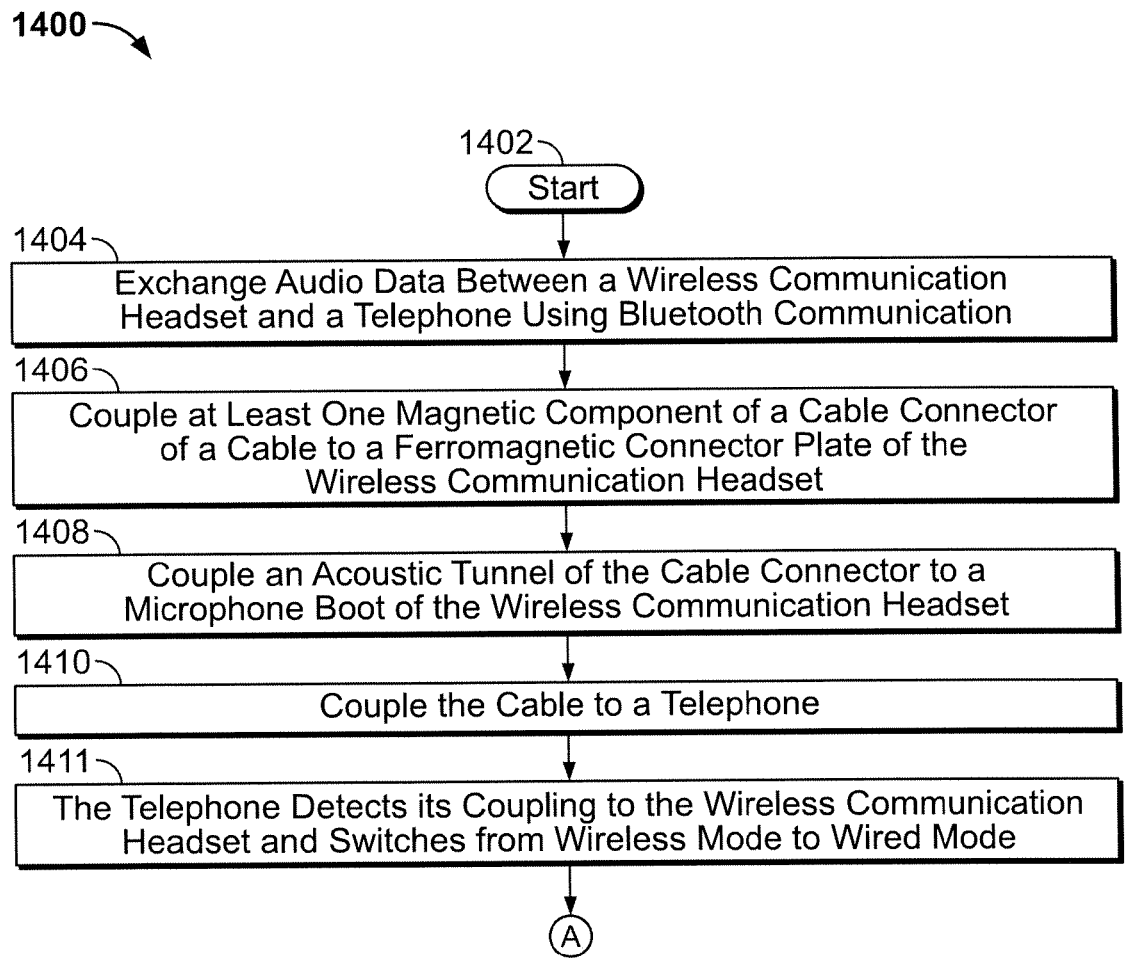
FIGS. 14A and 14B are flow charts depicting an illustrative method of operating a wireless communication handset in wired and wireless modes in accordance with an embodiment of the invention.
Figure 14B:
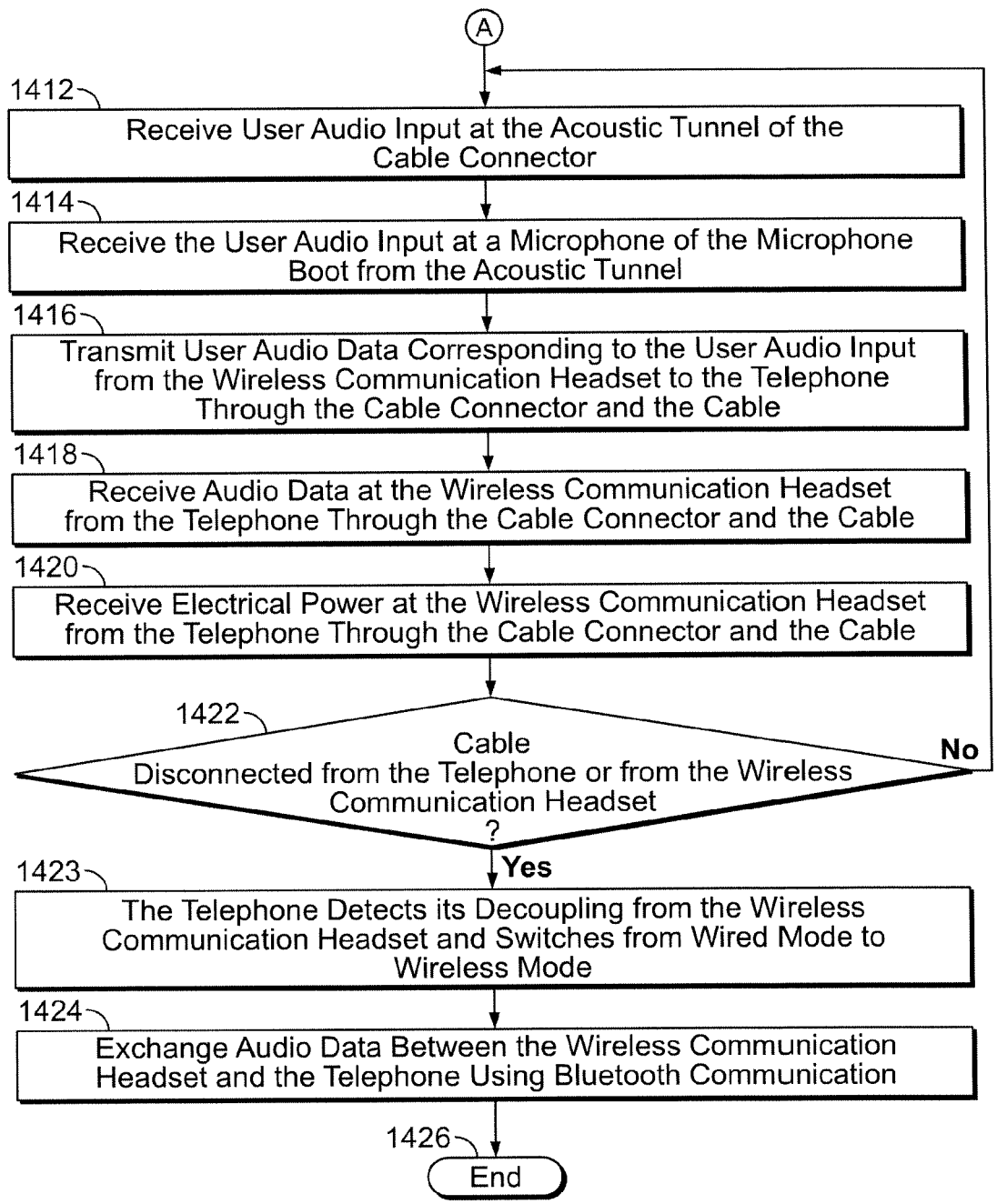

FIGS. 14A and 14B are flow charts depicting an illustrative method 1400 of operating a wireless communication handset in wired and wireless modes in accordance with an embodiment of the invention. Method 1400 can begin at step 1402 and proceed to step 1404, where audio data can be exchanged between a wireless communication headset and a telephone using Bluetooth communication. It will be understood that any suitable communication standard can be used in place of, or in addition to, Bluetooth communication during step 1402. In addition, non-audio data such as control signals or messages can be exchanged between the wireless communication headset and the telephone during step 1402.

During steps 1406, 1408, and 1410, the wireless communication headset can be coupled to the telephone through a cable, as illustrated in FIG. 1 and discussed in connection with FIGS. 4-13. In illustrative step 1406, at least one magnetic component of a cable connector of the cable can be coupled to a ferromagnetic connector plate of the wireless communication headset. It will be understood that any other suitable structures and methods can be used to couple the cable to the wireless communication headset, such as interlocking of pins, pressure exerted by fasteners or other physical apparatus, or any combination thereof.

In illustrative step 1408, an acoustic tunnel of the cable connector can be coupled to a microphone boot of the wireless communication headset, as discussed in connection with FIGS. 11A-12B, thereby forming a channel to convey audio input from a user, received at the cable connector, to a microphone of the wireless communication headset. It will be understood that this step can be omitted or modified as appropriate. For example, as discussed in connection with FIG. 13, the collective audio-receiving behavior of the cable connector and the wireless communication headset can be coordinated through appropriate electronic circuitry, instead of relying on the coupling of mechanical devices such as the acoustic tunnel and the microphone boot.

In illustrative step 1410, the cable can be connected to the telephone in any suitable manner. For example, the coupling can be performed by plugging in a cable connector, such as cable connector 104 of FIG. 1, to the telephone. It will be understood that steps 1406, 1408, and 1410 can proceed in a different order, and any of the steps can proceed substantially simultaneously with each other.

In illustrative step 1411, the telephone can detect its coupling to the wireless communication headset and switch from wireless mode to wired mode. The detection and switching can be performed using any appropriate circuitry on the telephone, the wireless communication headset, or both. Once the mode has been switched, the telephone can transmit and receive audio data to and from the wireless communication headset through a wired connection (e.g., through a cable such as cable 106 of FIG. 1). Method 1400 can then proceed through connecting step "A" to step 1414 of FIG. 14B.

Once the wireless communication headset is coupled to the telephone through the cable, audio data, electrical power, or both can be exchanged between the headset and the telephone through the wired connection provided by the cable. In step 1412, user audio input (e.g., from a user's voice) can be received at the acoustic tunnel of the cable connector, as discussed in connection with FIGS. 11A-12B. At step 1414, the user audio input can be received at a microphone of the wireless headset microphone boot from the acoustic tunnel, as discussed in connection with FIGS. 11A-12B. Audio data corresponding to this user audio input can then be transmitted from the wireless communication headset to the telephone through the cable connector and the cable at step 1416. As discussed in connection with FIG. 13, the use of the acoustic tunnel and the microphone boot to carry the user audio data to the wireless headset from the can be omitted, and other means of conveying user audio data to the telephone can be used instead (e.g., a wired connection between the cable connector and the telephone that does not pass through the wireless headset).

In the reverse direction, audio data can be received at the wireless communication headset from the telephone through the cable connector and the cable at step 1418, as discussed in connection with FIGS. 11A-13. In addition, electrical power can be received at the wireless communication headset from the telephone through the cable connector and the cable, as discussed in connection with FIGS. 11A-13. This power can be used to power operations of the wireless headset directly, to recharge a battery pack of the wireless headset, or both. It will be understood that any of steps 1412, 1414, 1416, 1418, and 1420 can be performed out of order or substantially simultaneously with each other, and that various modifications of those steps are contemplated. For example, after the wireless headset is coupled to the telephone through the cable, it is possible that electrical power can be received at the wireless headset from the telephone in accordance with step 1422, but that audio communication between the wireless headset and the telephone can occur through Bluetooth or other wireless communication instead of through the cable.

At step 1422, disconnection of the cable from the telephone, from the wireless headset, or both can be detected. If no disconnection has occurred, the method can proceed back to step 1412 and resume the exchange of audio data and electrical power between the wireless headset and the telephone. On the other hand, if disconnection has occurred, method 1400 can proceed to step 1423, where the telephone can detect its decoupling from the wireless communication headset and switch from wired mode to wireless mode. The detection and switching can be performed using any appropriate circuitry on the telephone, the wireless communication headset, or both. Once the mode has been switched, method 1400 can proceed to step 1424, where audio data can once again be exchanged between the wireless headset and the telephone through Bluetooth communication or any other suitable type of communication, as it did in step 1404. The method can end at step 1426. It will be understood that any of the steps of method 1400 can be omitted, modified, reordered, or any combination thereof, and that method 1400 is presented merely for purposes of illustrating the use of the invention, and is not meant to restrict operation of the invention to certain enumerated processes.

It will be understood that various modifications and combinations of the structures and methods disclosed above can be made without deviating from the spirit and scope of the invention. For example, although cable connectors of the invention are primarily discussed above as having four contacts interleaved with five magnetic components, any suitable number, shape, and configuration of contacts and magnetic components can be used. Similarly, although FIGS. 11A-12B depict acoustic tunnels that are substantially rectangular in shape, acoustic tunnels that are substantially curved or otherwise deviate in shape, size, or position can be used.

Thus it is seen that a communication headset with both wired and wireless modes is provided. One skilled in the art will appreciate that the invention can be practiced by other than the described embodiments, which are presented for purposes of illustration and not of limitation, and the present invention is limited only by the claims which follow.

What is claimed is:

1. A cable connector comprising:
   at least one cable contact operable to be electrically coupled to at least one headset contact of a wireless communication headset; and
   an acoustic tunnel operable to be coupled to a microphone boot of the wireless communication headset and to form a substantially continuous seal with the microphone boot, wherein the acoustic tunnel is operable to receive user audio input at an aperture of the acoustic tunnel when the acoustic tunnel is coupled to the microphone boot, and wherein the acoustic tunnel comprises a notched tip that is operable to mate with a notched recess of the microphone boot when the acoustic tunnel is coupled to the microphone boot.

2. The cable connector of claim 1 wherein the acoustic tunnel is at least partially curved in shape.

3. The cable connector of claim 1 further comprising at least one wire respectively coupled to the at least one cable contact and operable to transfer electrical power from a telephone to the at least one headset contact.

4. The cable connector of claim 1 further comprising at least one wire respectively coupled to the at least one cable contact and operable to transfer data corresponding to the user audio input from the at least one cable contact to a telephone.

5. A cable connector comprising:
   at least one cable contact operable to be electrically coupled to at least one headset contact of a wireless communication headset; and
   an acoustic tunnel operable to be coupled to a microphone boot of the wireless communication headset and to form a substantially continuous seal with the microphone boot, wherein the acoustic tunnel is operable to receive user audio input at an aperture of the acoustic tunnel when the acoustic tunnel is coupled to the microphone boot, wherein the acoustic tunnel is substantially rectangular in shape.

6. The cable connector of claim 5 further comprising at least one wire respectively coupled to the at least one cable contact and operable to transfer electrical power from a telephone to the at least one headset contact.

7. The cable connector of claim 5 further comprising at least one wire respectively coupled to the at least one cable contact and operable to transfer data corresponding to the user audio input from the at least one cable contact to a telephone.

8. A cable connector comprising:
   at least one cable contact operable to be electrically coupled to at least one headset contact of a wireless communication headset;
   a microphone operable to receive user audio input when the at least one cable contact is coupled to the at least one headset contact;
   a speaker operable to receive user audio data corresponding to the user audio input from the microphone and transmit the user audio data to a microphone boot of the wireless communication headset when the at least one cable contact is coupled to the at least one headset contact; and
   an acoustic tunnel operable to couple the speaker to a microphone boot of the wireless communication headset, wherein the acoustic tunnel comprises a notched tip that is operable to mate with a notched recess of the microphone boot when the acoustic tunnel is coupled to the microphone boot.

9. A cable connector comprising:
   at least one cable contact operable to be electrically coupled to at least one headset contact of a wireless communication headset;
   a microphone operable to receive user audio input when the at least one cable contact is coupled to the at least one headset contact;
   a speaker operable to receive user audio data corresponding to the user audio input from the microphone and transmit the user audio data to a microphone boot of the wireless communication headset when the at least one cable contact is coupled to the at least one headset contact; and
   an aperture in a housing of the cable connector, wherein the microphone is coupled to the aperture and substantially covers a face of the aperture that is inside the housing.

10. A cable connector comprising:
    at least one cable contact operable to be electrically coupled to at least one headset contact of a wireless communication headset;
    a first microphone operable to receive user audio input when the at least one cable contact is coupled to the at least one headset contact; and
    control circuitry operable to transmit at least one control signal to detection circuitry of the wireless communication headset, for disabling a second microphone that is located on the wireless communication headset, when the at least one cable contact is coupled to the at least one headset contact.

11. The cable connector of claim 10 further comprising:

transmission circuitry coupled to the control circuitry, wherein:

the control circuitry is further operable to transmit user audio data indicative of the user audio input to the transmission circuitry; and the transmission circuitry is operable to transmit the user audio data to a telephone through at least one wire that is coupled to the at least one cable contact.

12. The cable connector of claim 10 wherein the control circuitry is further operable to transmit user audio data indicative of the user audio input to the detection circuitry of the wireless communication headset.

13. The cable connector of claim 10 further comprising an aperture in a housing of the cable connector, wherein the first microphone is coupled to the aperture and substantially covers a face of the aperture that is inside the housing.

14. The cable connector of claim 10 further comprising at least one magnetic component that is operable to be magnetically coupled to a headset connector plate of the wireless communication headset when the at least one cable contact is coupled to the at least one headset contact.

* * * * *